(12) United States Patent
Fukao et al.

(10) Patent No.: US 9,592,879 B2
(45) Date of Patent: Mar. 14, 2017

(54) SHIFT POSITIONING MECHANISM

(75) Inventors: Kazutaka Fukao, Osaka (JP);
Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 1392 days.

(21) Appl. No.: 13/116,142

(22) Filed: May 26, 2011

(65) Prior Publication Data

US 2012/0297919 A1 Nov. 29, 2012

(51) Int. Cl.
*B62K 23/06* (2006.01)
*B62M 25/04* (2006.01)

(52) U.S. Cl.
CPC .............. *B62K 23/06* (2013.01); *B62M 25/04* (2013.01); *Y10T 74/20438* (2015.01)

(58) Field of Classification Search
CPC ......... B62K 23/06; B62M 25/04; G05G 1/04; Y10T 74/20438
USPC ........... 74/489, 473.14, 473.15, 501.6, 502.2
IPC ............................................ B62M 25/00,25/04
See application file for complete search history.

(56) References Cited

U.S. PATENT DOCUMENTS

| | | | |
|---|---|---|---|
| 1,442,003 A | 1/1923 | Rohrer | |
| 5,213,005 A * | 5/1993 | Nagano | 74/502.2 |
| 6,694,840 B2 * | 2/2004 | Kawakami | 74/502.2 |
| 6,718,843 B2 | 4/2004 | Campagnolo | |
| 7,000,496 B2 * | 2/2006 | Wessel et al. | 74/502.2 |
| 7,124,873 B2 * | 10/2006 | Tsumiyama | 192/217 |
| 7,392,723 B2 * | 7/2008 | Tsumiyama | 74/502.2 |
| 7,437,969 B2 * | 10/2008 | Ose | 74/502.2 |
| 7,526,979 B2 | 5/2009 | Tsumiyama | |
| 7,650,813 B2 * | 1/2010 | Tsumiyama | 74/502.2 |
| 7,665,382 B2 * | 2/2010 | Kawakami | 74/489 |
| 7,665,384 B2 | 2/2010 | Sato et al. | |
| 8,375,823 B2 * | 2/2013 | Funai | 74/502.2 |
| 8,375,824 B2 * | 2/2013 | Miki | 74/502.2 |
| 8,485,060 B2 * | 7/2013 | Emura et al. | 74/473.14 |
| 8,534,156 B2 * | 9/2013 | Miki et al. | 74/502.2 |
| 8,549,955 B2 * | 10/2013 | Sato et al. | 74/502.2 |
| 2006/0189423 A1 | 8/2006 | Ichida et al. | |
| 2007/0151394 A1 | 7/2007 | Kawakami | |
| 2008/0022803 A1 | 1/2008 | Funai | |
| 2008/0087126 A1 | 4/2008 | Oda et al. | |
| 2008/0264197 A1 | 10/2008 | Shahana | |
| 2008/0314183 A1 | 12/2008 | Miki | |

(Continued)

OTHER PUBLICATIONS

European Search Report of corresponding EP Application No. 11 19 3632.4 dated May 21, 2012.

*Primary Examiner* — Adam D Rogers
(74) *Attorney, Agent, or Firm* — Global IP Counselors, LLP

(57) ABSTRACT

A shift positioning mechanism includes a take-up member movably arranged with respect to a fixed member in first and second directions. A stopping pawl has a stopping tooth and is rotatably mounted on a first rotational axis so as to move between a non-stop position and a stop position. A positioning pawl has a positioning tooth and is rotatably mounted on the first rotational axis so as to move between a non-holding position and a holding position. A releasing member is movably arranged between a non-releasing position and a releasing position so as to rotate the stopping pawl and the positioning pawl. The releasing member rotates the stopping pawl and the positioning pawl such that the stopping tooth moves from the non-stop position to the stop position prior to the positioning tooth moving from the holding position to the non-holding position.

10 Claims, 19 Drawing Sheets

(56) References Cited

U.S. PATENT DOCUMENTS

2009/0165591 A1* 7/2009 Kawakami ................... 74/502.2
2009/0173182 A1* 7/2009 Watarai et al. .............. 74/502.2
2009/0308194 A1* 12/2009 Shahana ...................... 74/502.2
2011/0132123 A1    6/2011 Tsai et al.
2013/0319166 A1* 12/2013 Fukao et al. ................. 74/502.2

* cited by examiner

SHIFT POSITIONING MECHANISM

BACKGROUND

Field of the Invention

This invention generally relates to a shift positioning mechanism. More specifically, the present invention relates to a shift positioning mechanism that is operates a bicycle component.

Background Information

Bicycle shift operating devices are used to shift gears of a multi-speed bicycle transmission. The multi-speed bicycle transmission typically includes a chain, one or more front sprockets or gears mounted to a front crankset and a plurality of rear sprockets or gears mounted to a rear hub of a rear wheel. The front and rear shift operating devices are designed to operate gear changing devices (e.g., a derailleur or an internal hub gear mechanism) to select a desired gear ratio. A pedaling force from the rider is transferred from the front sprockets to the rear sprockets via the chain for turning the rear wheel.

Most mechanical brake/shift operating devices use control cables that connects the brake/shift operating devices to the brake devices for braking and the gear changing devices for shifting. These control cables are typically Bowden type cables with an outer case and an inner wire. For shifting, a shift lever is usually used for operating the brake device. For example, the brake lever is also used as one of the shift lever for pulling the shift cable, while a separate lever is provided for releasing the shift cable. An operating force is typically applied by one of the rider's fingers to operate the shift levers, which in turn transmits the operating force to the shift cable via a shift operating unit. In many cases, the shift operating unit has a shift cable take-up spool. The inner wire of the shift cable is attached at one end to the cable take-up spool and its other end is attached to a part of a gear changing device such as a derailleur or an internal hub gear mechanism. The inner wire of the shift cable is wrapped (pulled) or unwrapped (released) about a peripheral edge of the shift cable take-up spool of the shift operating unit to pull and release the inner wire. By rotating the cable take-up spool, the inner wire slides within the outer case to pull or release the inner wire that operates the gear changing device. In the case of road shifters (e.g., brake/shift operating devices), the shift cable is typically routed along the handlebar. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

One aspect of the present disclosure is to provide a new shift positioning mechanism that effectively controls the release of a take-up member.

In view of the state of the known technology, a shift positioning mechanism is proposed that basically comprises a fixed member, a take-up member, a positioning ratchet, a stopping pawl, a positioning pawl and a releasing member. The take-up member is movably arranged with respect to the fixed member in a first direction and a second direction that is different from the first direction. The positioning ratchet is fixedly coupled to the take-up member to move with the take-up member. The stopping pawl has a stopping tooth and is rotatably mounted on a first rotational axis such that the stopping tooth moves between a non-stop position and a stop position to prevent movement of the take-up member in the first direction. The positioning pawl has a positioning tooth and is rotatably mounted on the first rotational axis such that the positioning tooth moves between a non-holding position and a holding position to hold the take-up member in the first direction. The releasing member is movably arranged between a non-releasing position and a releasing position such that the releasing member rotates the stopping pawl and the positioning pawl. The releasing member rotates the stopping pawl and the positioning pawl such that the stopping tooth starts to move from the non-stop position to the stop position prior to the positioning tooth starting to move from the holding position to the non-holding position.

Various objects, features, aspects and advantages of the present disclosure will become apparent to those skilled in the art from the following detailed description, which, taken in conjunction with the annexed drawings, discloses one embodiment of a bicycle shift operating device.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
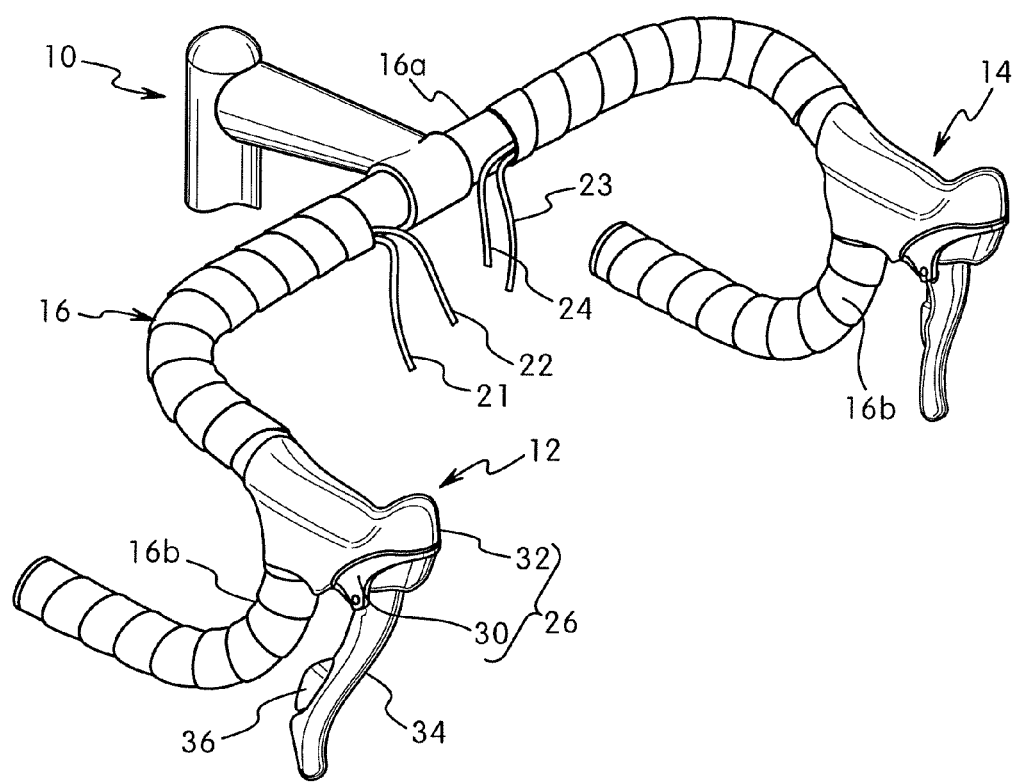
FIG. 1 is a front perspective view of a portion of a bicycle equipped with a pair of bicycle shift operating devices coupled to a drop type handlebar in their installed positions in accordance with a first embodiment.
Figure 2:
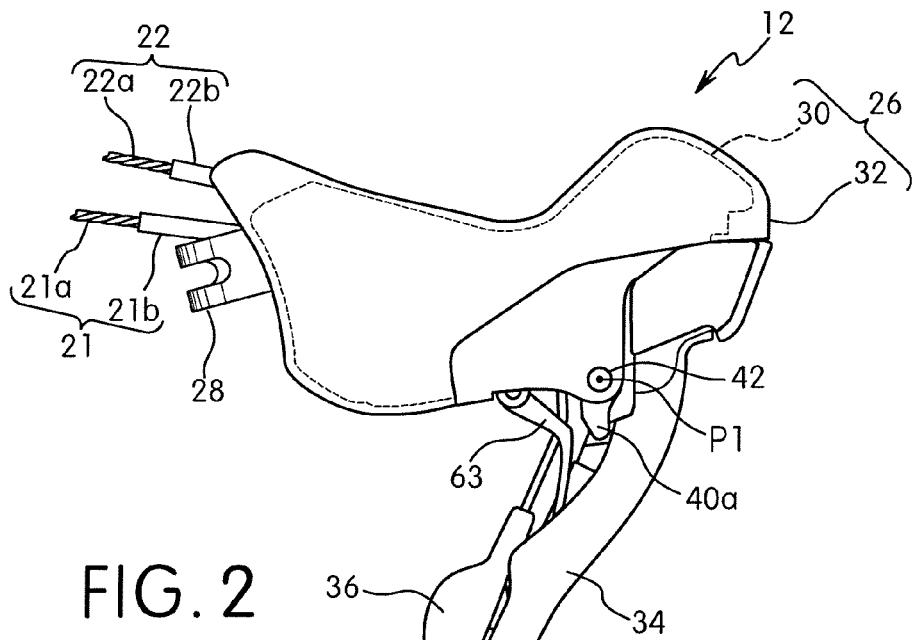
FIG. 2 is an outside elevational view of the right hand side shift operating devices illustrated in FIG. 1 with the brake/shift lever and the shift (release) lever in their rest positions.

Referring initially to FIGS. 1 and 2, a bicycle driving system of a bicycle 10 that is equipped with a pair of bicycle shift operating devices 12 and 14 is illustrated. The bicycle shift operating devices 12 and 14 are mounted on a drop down handlebar 16 in accordance with the illustrated embodiments as seen in FIG. 1. The bicycle shift operating device 12 is a right hand side control device operated by the rider's right hand to operate a first brake device (not shown) and a first gear shifting device (not shown, e.g., a cable operated rear derailleur). The bicycle shift operating device 14 is a left hand side control device operated by the rider's left hand to operate a second brake device (not shown) and a second gear shifting device (not shown, e.g., a cable operated front derailleur). The first and second gear shifting devices are part of a conventional bicycle driving system that is used to shift a bicycle chain for changing speeds of the drive train in a relatively conventional manner. In the illustrated embodiment, the bicycle shift operating device 12 is operatively coupled to the first gear shifting device via a shift control cable 21 and the first brake device via a brake control cable 22. The bicycle shift operating device 14 is operatively coupled to the second gear changing device via a shift control cable 23 and the second brake device via a brake control cable 24.

Figure 3:
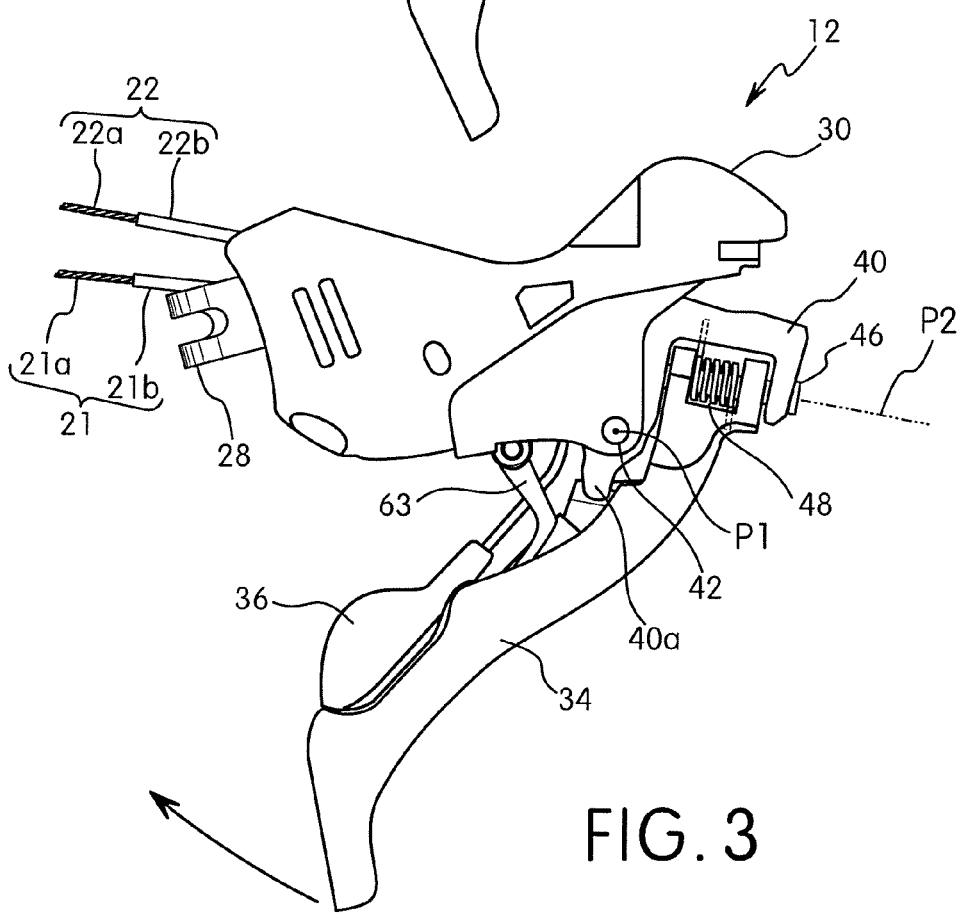
FIG. 3 is an outside elevational view of the right hand side shift operating device illustrated in FIG. 2 with the grip cover removed and the brake/shift lever pivoted to a braking position.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIGS. 2 and 3, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle shift operating device 12 to the first gear shifting device for shifting the first gear shifting device in response to operation of the bicycle shift operating device 12.

In the illustrated embodiment, the right and left hand side bicycle shift operating devices 12 and 14 are essentially identical in operation, except that they are mirror images of each other and they may have a different number of shift operations. In other words, the left hand side bicycle shift operating device 14 is substantially identical to the right hand side bicycle shift operating device 12, except for the shifting unit (not shown) of the left hand side bicycle shift operating device 14 has been modified to be a mirror image and to decrease the number of gears that can be shifted. Thus, only the right hand side bicycle shift operating device 12 will be discussed and illustrated herein.

As seen in FIG. 1, normally, the gripping portions of the drop down handlebar 16 and portions of the control cables 21 and 22 are covered by the bar tape. The drop down handlebar 16 typically includes a straight cross portion 16a and a pair of downwardly curved portions 16b. The straight cross portion 16a connects upper ends of the downwardly curved portions 16b. The shift operating devices 12 and 14 are mounted to the downwardly curved portions 16b of the drop down handlebar 16. In the illustrated embodiment, the bicycle shift operating device 12 is mounted on the right hand side of the drop down handlebar 16 for operating the first gear shifting device (e.g., a cable operated rear front derailleur) and the bicycle shift operating device 14 is mounted on the left hand side of the drop down handlebar 16 for operating the second gear shifting device (e.g., a cable operated front derailleur). However, each of the shift operating devices 12 and 14 can be manufactured as a mirror of the illustrated embodiment, such that the shift operating devices 12 and 14 can be mounted on opposite sides of the drop down handlebar 16.

Figure 4:
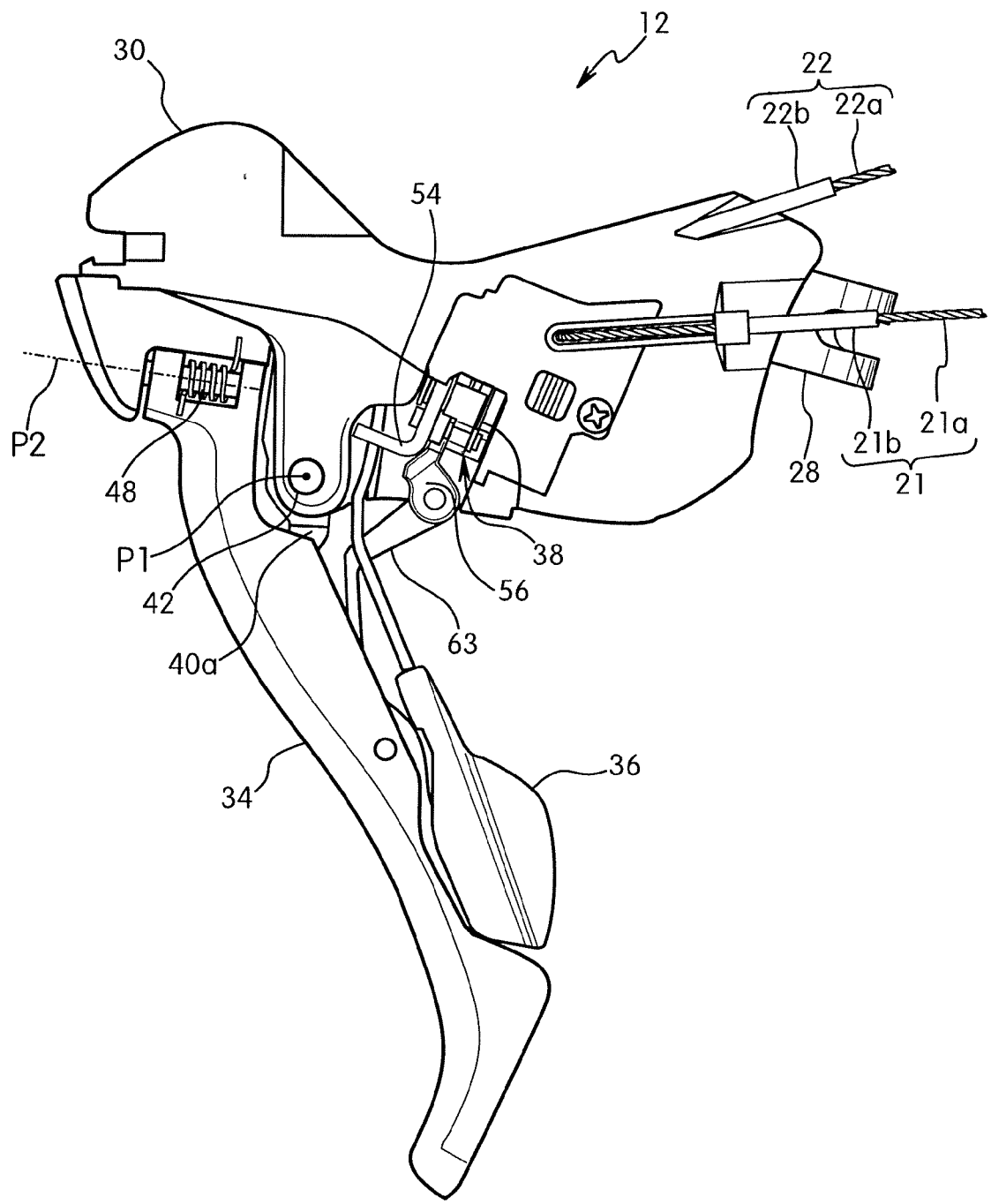
FIG. 4 is an inside elevational view of the right hand side shift operating device illustrated in FIGS. 2 and 3 with the grip cover removed and the brake/shift lever and the shift (release) lever in their rest positions.

As seen in FIGS. 2 to 4, the bicycle shift operating device 12 includes a bracket or base member 26 that is fixedly mounted to one of the curved portions 16b of the drop down handlebar 16 by a handlebar mounting structure 28. Since the bracket 26 is fixed to the drop down handlebar 16 by the handlebar mounting structure 28, the bracket 26 constitutes a fixed member. Riders sometimes grip the bracket 26 and lean on the bracket 26 during riding. It is desirable to provide a comfortable feeling for the rider's hand while the rider is gripping the bracket 26. Thus, the bracket 26 has a rigid main body 30 and a soft outer elastomeric grip cover 32. The grip cover 32 partially covers the main body 30 as seen in FIG. 2. In particular, the grip cover 32 is stretched over a gripping portion of the main body 30. Typically, the main body 30 is made of a rigid plastic material. The bracket 26 is a stationary member when mounted to the handlebar 16. The handlebar mounting structure 28 is preferably a conventional band clamp or similar structure that is used in a road shifter for mounting to a drop down style handlebar such as the drop down handlebar 16. Thus, the handlebar mounting structure 28 will not be discussed in detail herein.

In this embodiment, as best seen in FIG. 4, the bicycle shift operating device 12 further includes a brake/shift lever 34, a shift lever 36 and a shift operating unit 38. The main body 30 of the bracket 26 houses the shift operating unit 38 in an interior cavity of the main body 30. The brake/shift lever 34 and the shift lever 36 are examples of user operated levers used for operating the shift operating unit 38 as discussed below. The brake/shift lever 34 and the shift lever 36 are movable with respect to the bracket 26 to operate the shift operating unit 38.

The brake/shift lever 34 is used to perform both a braking operation and a shifting operation, while the shift lever 36 only performs a shifting operation. The brake/shift lever 34 and the shift lever 36 are operatively coupled to the shift operating unit 38 for performing shifting operations in a gear shifting device to change gears (i.e., shifting a chain between the gears). The brake/shift lever 34 and the shift lever 36 are preferably both pivoted relative to the main body 30 of the bracket 26 in a direction towards a bicycle longitudinal center plane for performing shifting operations.

Referring to FIGS. 5 to 8, shifting operations of the brake/shift lever 34 and the shift lever 36 are illustrated. The brake/shift lever 34 and the shift lever 36 are shown in their rest positions in FIG. 6. The term "rest position" as used herein refers to a state in which the part (e.g., the brake/shift lever 34 and the shift lever 36) remains stationary without the need of a user holding the part in that state corresponding to the rest position. The brake/shift lever 34 and the shift lever 36 are trigger type levers that are biased to the rest positions in a conventional manner.

Figure 5:
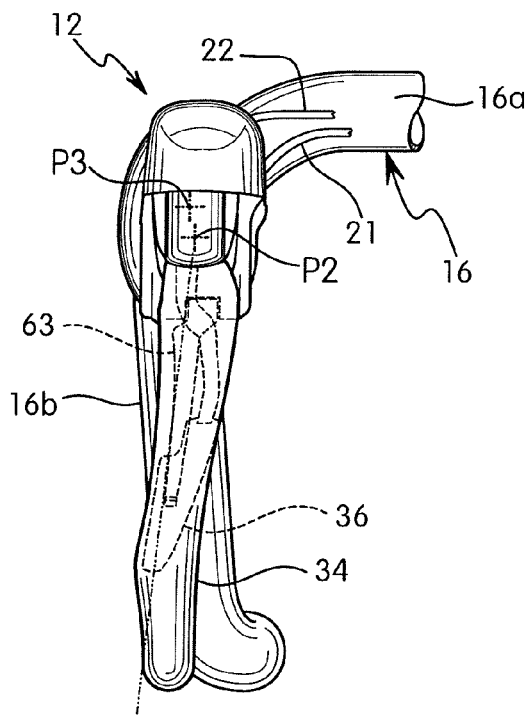
FIG. 5 is a front elevational view of the portion of the drop type handlebar and the right hand side shift operating device illustrated in FIGS. 2 to 4 with the brake/shift lever and the shift (release) lever in their rest positions.
Figure 6:
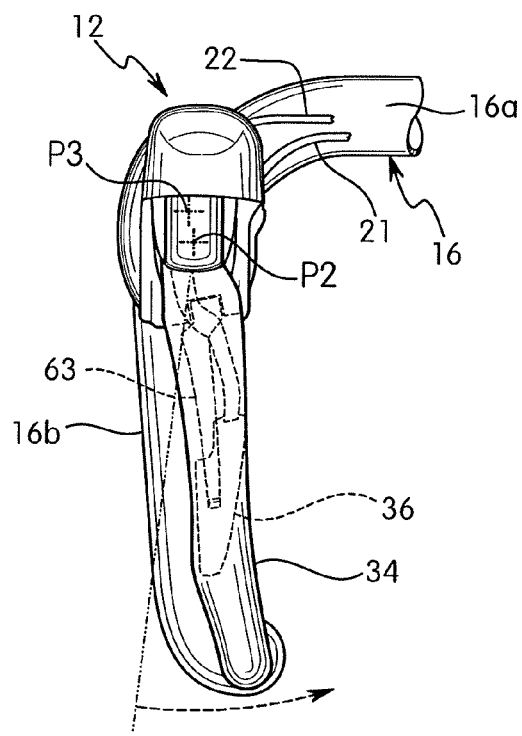
FIG. 6 is a front elevational view of the portion of the drop type handlebar and the right hand side shift operating device illustrated in FIG. 5 with the brake/shift lever of the right hand side shift operating device moved to a first cable pulling position.
Figure 7:
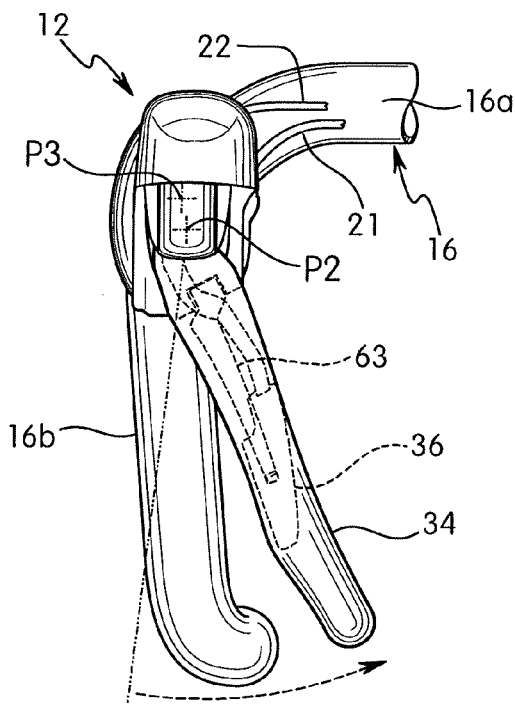
FIG. 7 is a front elevational view of the portion of the drop type handlebar and the right hand side shift operating device illustrated in FIGS. 5 and 6 with the brake/shift lever of the right hand side shift operating device moved to a second cable pulling position.
Figure 8:
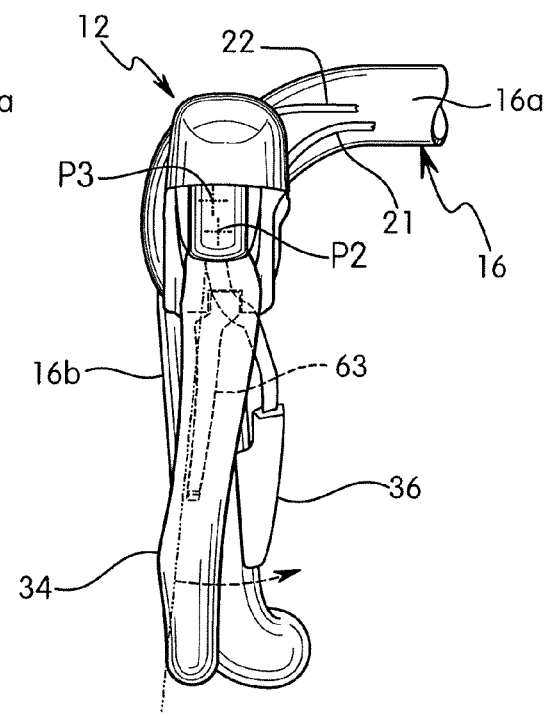
FIG. 8 is a front elevational view of the portion of the drop type handlebar and the right hand side shift operating device illustrated in FIGS. 5 to 7 with the shift (release) lever of the right hand side shift operating device moved to a cable releasing position.

The brake/shift lever 34 functions as a brake lever. The brake/shift lever 34 pulls the inner wire 22a of the brake cable 22 by pivoting the brake/shift lever 34 about a brake pivot axis P1 relative to the main body 30 of the bracket 26 towards the curved portion 16b of the handlebar 16 as seen in FIG. 3. The brake/shift lever 34 also functions as a cable pulling (winding) lever. The brake/shift lever 34 pulls the inner wire 21a of the shift cable 21 into the shift operating unit 38 by pivoting the brake/shift lever 34 about a shift pivot axis P2 relative to the main body 30 of the bracket 26 towards a center longitudinal plane of the bicycle 10 as seen in FIGS. 5 to 7.

The shift lever 36 functions as a cable releasing lever. The shift lever 36 releases the inner wire 21a from the shift operating unit 38 by pivoting the shift lever 36 about a shift pivot axis P3 relative to the main body 30 of the bracket 26 towards the center longitudinal plane of the bicycle 10. In the illustrated embodiment, the shift lever 36 moves with the brake/shift lever 34 as the brake/shift lever 34 is moved to perform braking operations and shifting operations as discussed below. However, the brake/shift lever 34 generally remains stationary during movement of the shift lever 36 to perform cable releasing operations as discussed below.

Figure 9:
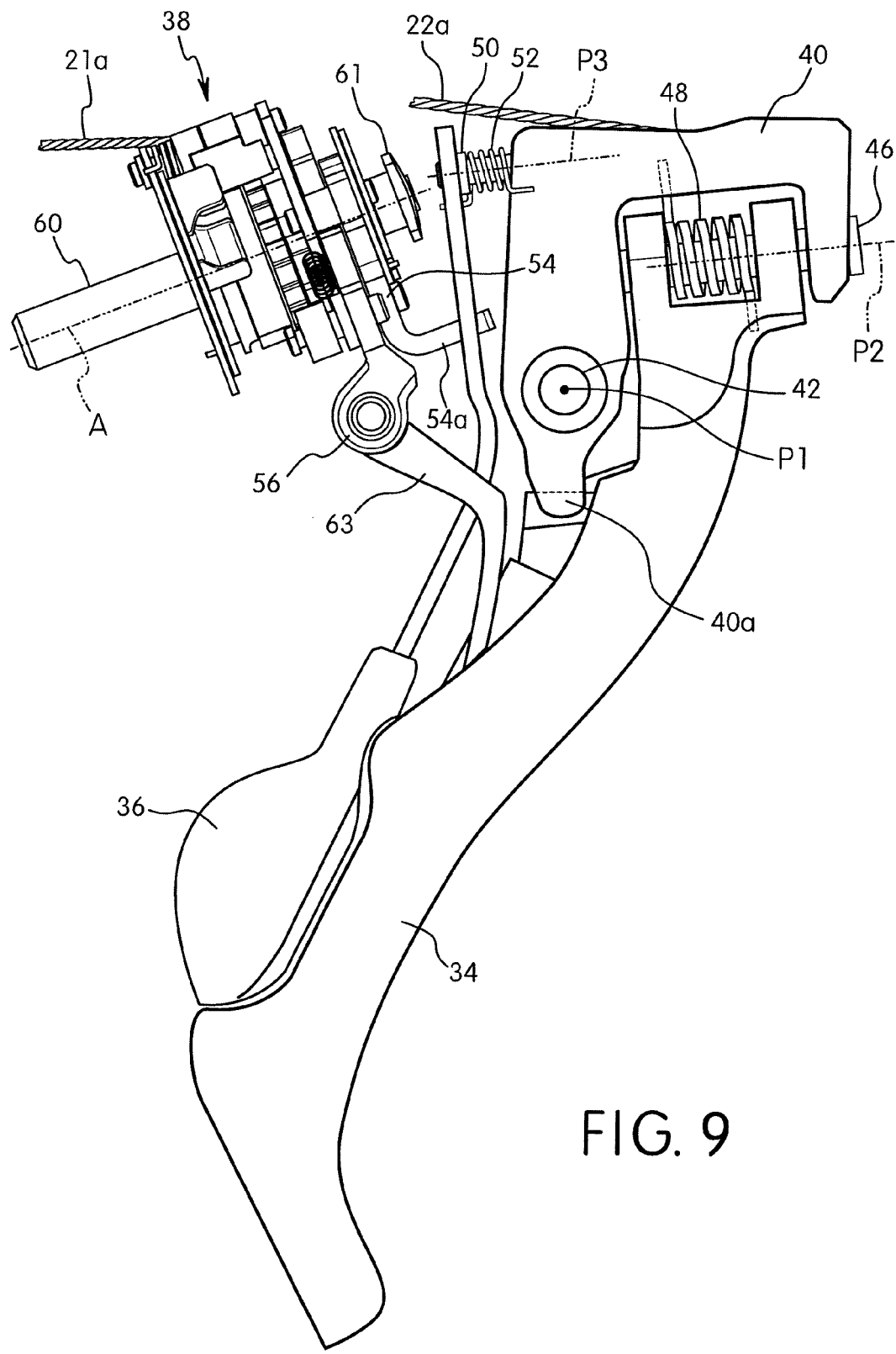
FIG. 9 is an outside elevational view of the shift operating unit of the right hand side shift operating device and the brake/shift lever and the shift (release) lever of the right hand side shift operating device in their rest positions.

Referring to FIGS. 3 and 9, a support member 40 is provided to support the brake/shift lever 34 and the shift lever 36 on the main body 30 of the bracket 26. The support member 40 is pivotally attached to the main body 30 of the bracket 26 by a pivot pin 42 that defines the brake pivot axis P1. A biasing element 44 is provided between the main body 30 and the support member 40. The biasing element 44 is arranged for biasing the support member 40 and the brake/shift lever 34 to a rest position as seen in FIG. 4. In the illustrated embodiment, the biasing element 44 is a torsion spring with its coiled portion disposed on the pivot pin 42 and its first and second free ends contacting the main body 30 and the support member 40, respectively.

Figure 10:
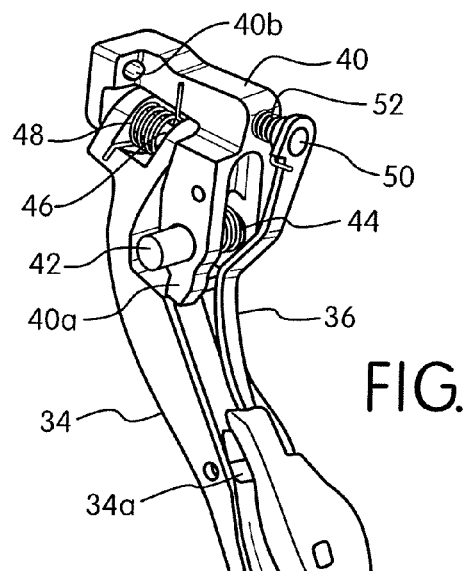
FIG. 10 is a rear side perspective view of the brake/shift lever and the shift (release) lever of the right hand side shift operating device.
Figure 11:
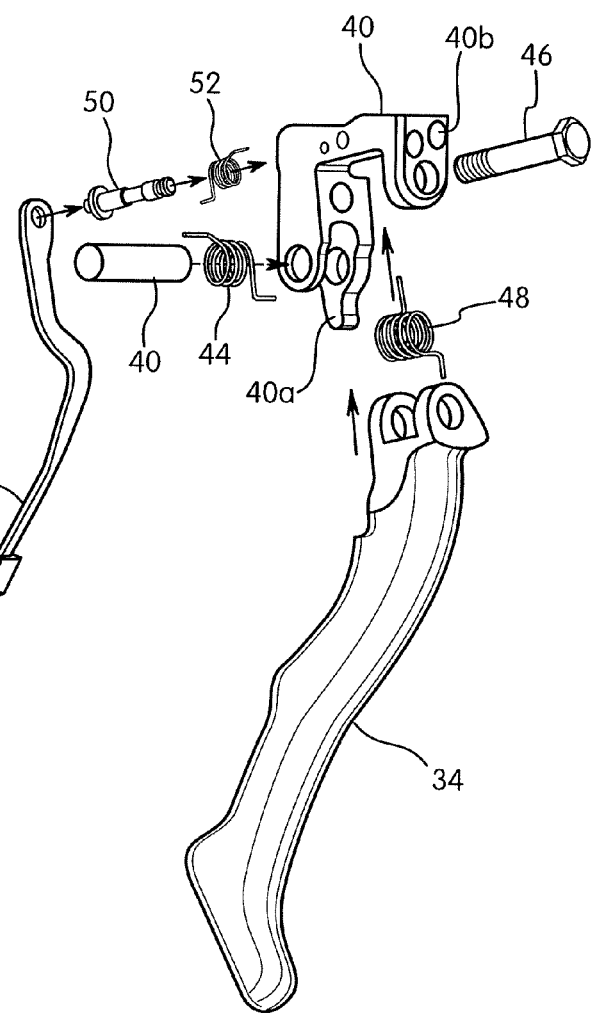
FIG. 11 is an exploded front side perspective view of the brake/shift lever and the shift (release) lever of the right hand side shift operating device.

As best seen in FIGS. 3 and 9, the brake/shift lever 34 is pivotally attached to the support member 40 by a pivot pin 46 that defines the shift pivot axis P2. As best seen in FIGS. 10 and 11, a biasing element 48 is provided between the brake/shift lever 34 and the support member 40. The biasing element 48 is arranged for biasing the brake/shift lever 34 to a rest position against a tab 40a of the support member 40 as seen in FIGS. 3 and 4. In the illustrated embodiment, the biasing element 48 is a torsion spring with its coiled portion disposed on the pivot pin 46 and its first and second free ends contacting the brake/shift lever 34 and the support member 40, respectively.

As best seen in FIGS. 10 and 11, the support member 40 also includes a brake cable attachment structure 40b (e.g., a bore) for attaching the inner wire 22a. When the brake/shift lever 34 is pivoted about the brake pivot axis P1, the brake/shift lever 34 pulls the inner wire 22a relative to the outer case 22b to perform a braking operation. Generally speaking, in performing braking operations, the brake/shift lever 34 moves in a longitudinal direction with respect to the bracket 26. In other words, during a braking operation, the brake/shift lever 34 moves along a brake operating plane that is substantially perpendicular the shift operating planes of the brake/shift lever 34 and the shift lever 36. Thus, the brake/shift lever 34 moves with respect to the bracket 26 about the brake pivot axis P1 that is perpendicular to the shift pivot axes P2 and P3.

Referring back to FIGS. 5 to 7, in performing a shifting (cable winding or pulling) operation with the brake/shift lever 34, the brake/shift lever 34 is moved (pivoted) laterally inward about the shift pivot axis P2 from the rest position (FIG. 5) to either a first cable pulling position (FIG. 6) to perform a single gear shift operation or a second cable releasing position (FIG. 7) to perform a two gear shift operation in a single progressive movement. In this illustrated embodiment, when the brake/shift lever 34 is moved to perform a shifting operation, the shift lever 36 moves with the brake/shift lever 34.

Referring to FIGS. 9 to 11, the shift lever 36 is also pivotally mounted to the support member 40 by a pivot pin 50 about the shift pivot axis P3. The shift pivot axis P3 can be either parallel to the shift pivot axis P2 or angled with respect to the shift pivot axis P2 as viewed in a direction parallel to the brake pivot axis P1. A biasing element 52 is provided between the brake/shift lever 34 and the support member 40 for biasing the shift lever 36 to a rest position. In the illustrated embodiment, the biasing element 52 is a torsion spring with its coiled portion disposed on the pivot pin 50 and its first and second free ends contacting the shift lever 36 and the support member 40, respectively.

Referring back to FIGS. 5 and 8, in performing a shifting (releasing) operation with the shift lever 36, the shift lever 36 is moved laterally inward about the shift pivot axis P3 from the rest position (FIG. 5) to a cable releasing position (FIG. 8) to perform a gear shift operation. In this illustrated embodiment, when the shift lever 36 is moved to perform a shifting operation, the brake/shift lever 34 does not move with the shift lever 36. Rather during performing a shifting operation with the shift lever 36, the brake/shift lever 34 basically remains in its rest position due to the biasing force of the biasing element 48.

Generally speaking, in performing shifting operations, the brake/shift lever 34 and the shift lever 36 both move in a lateral direction with respect to the bracket 26 along shift operating planes to operate the shift operating unit 38. While in this illustrated embodiment, the shift pivot axes P2 and P3 are not coincident (offset), the shift pivot axes P2 and P3 could be made to be coincident if needed and/or desired. Moreover, the shift operating unit 38 can be operated in a variety of different ways, if needed and/or desired. For example, the shift operating unit 38 could be operated with buttons instead of levers.

Figure 12:
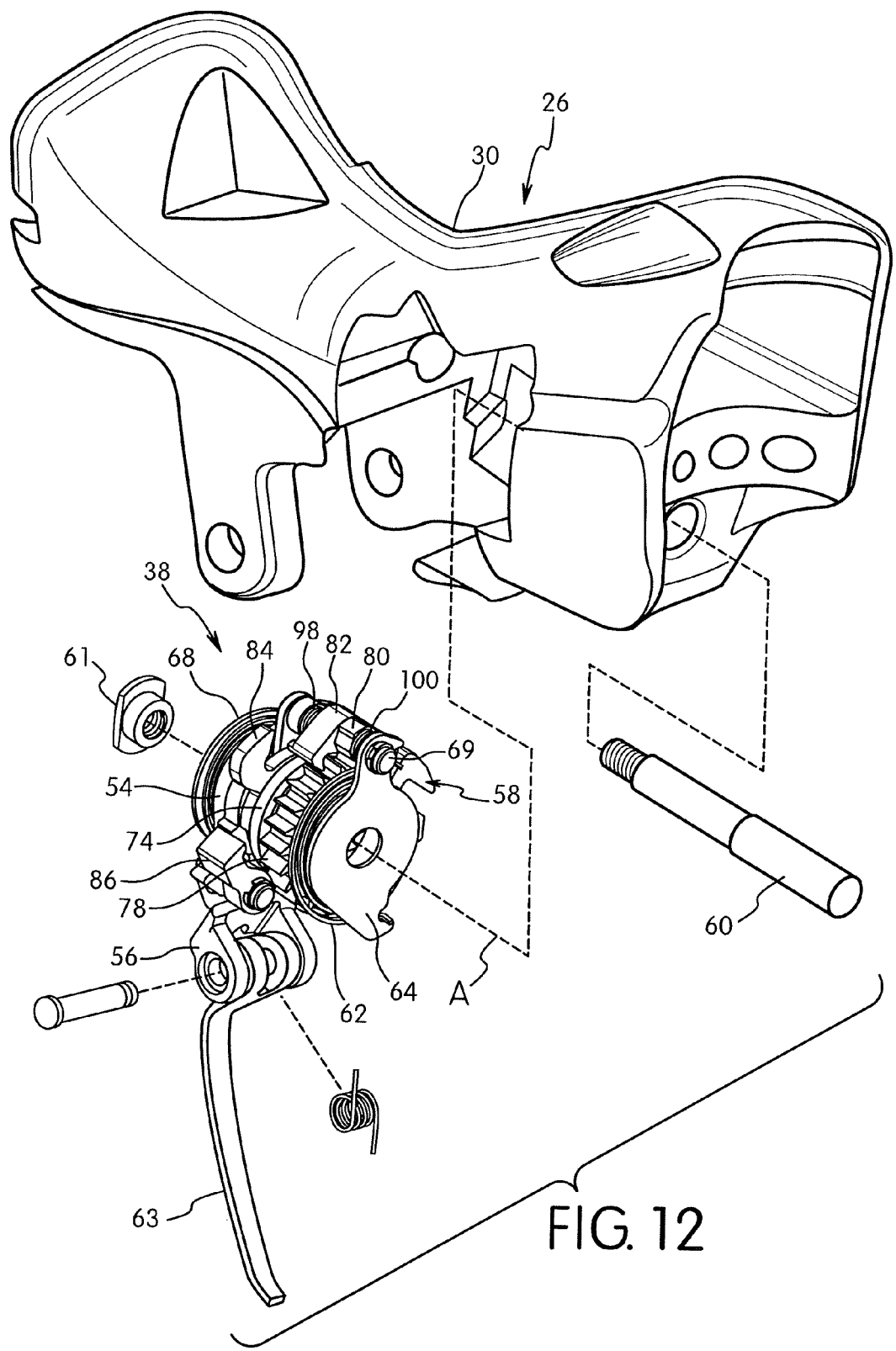
FIG. 12 is an exploded front side perspective view of the bracket and the shift operating unit of the right hand side shift operating device.
Figure 13:
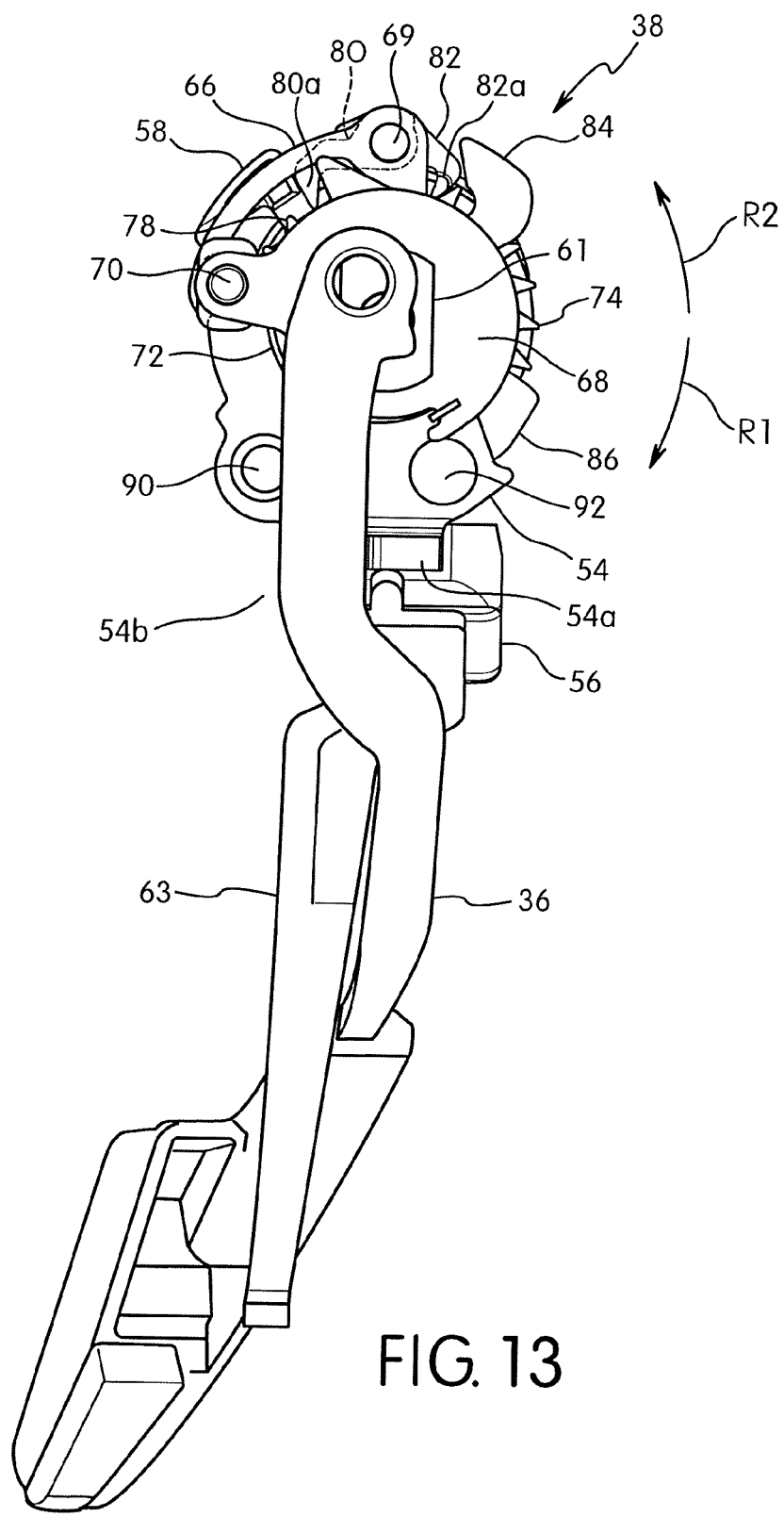
FIG. 13 is a front side perspective view of the shift operating unit and the shift (release) lever of the right hand side shift operating device as viewed along the center axis of main shift unit axle.
Figure 14:
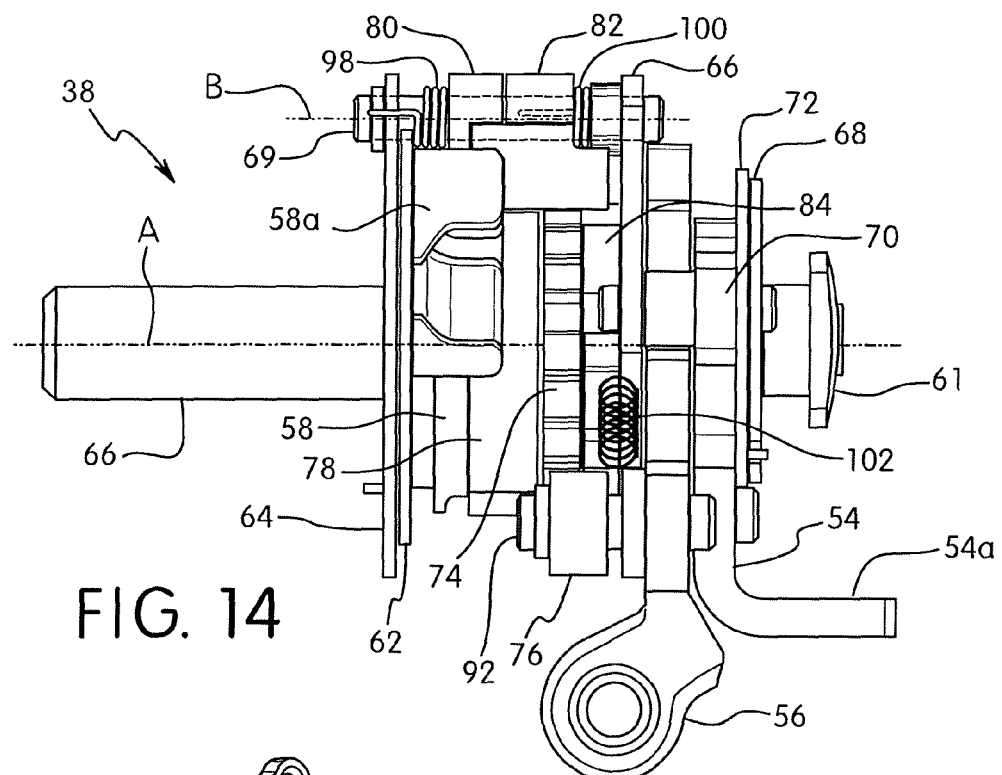
FIG. 14 is an enlarged outside elevational view of the shift operating unit of the right hand side shift operating device.
Figure 15:
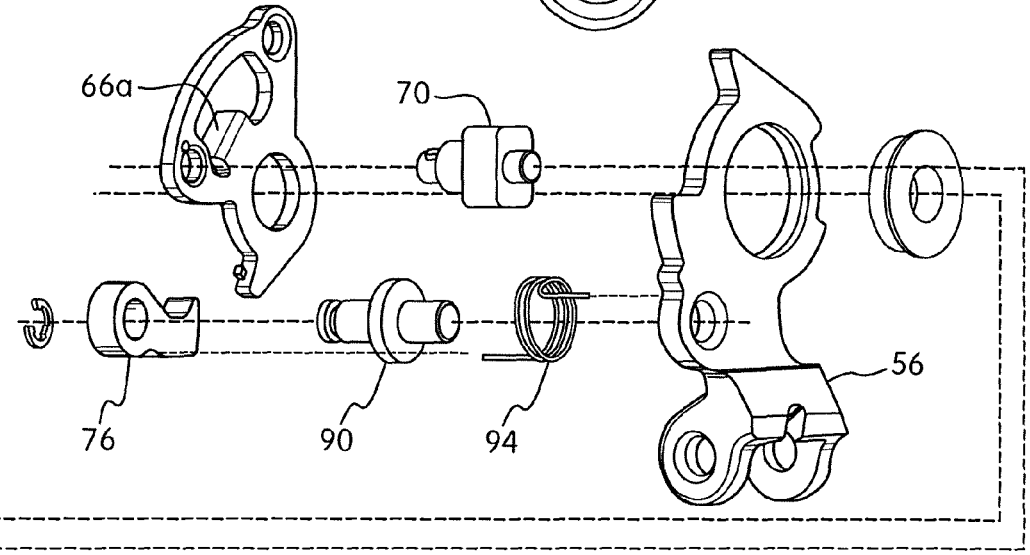
FIG. 15 is an exploded front perspective view of selected parts of the shift operating unit of the right hand side shift operating device.
Figure 15:
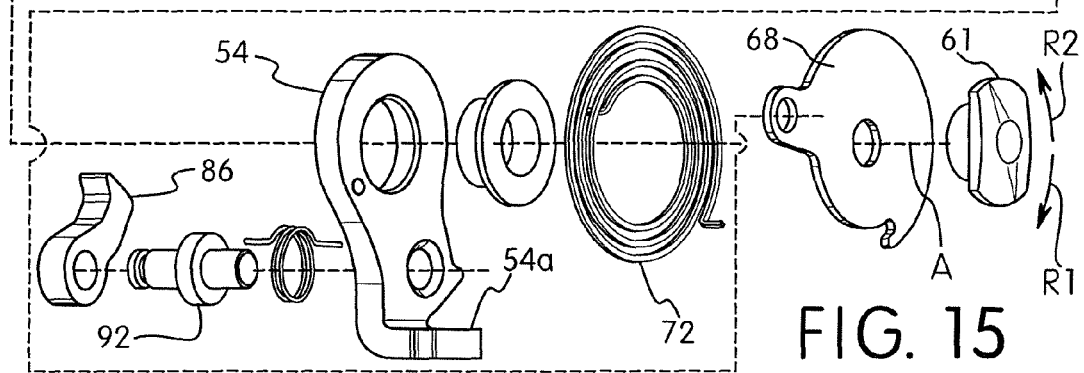

Turning now to FIGS. 12 to 18, the shift operating unit 38 will now be discussed. As seen in FIG. 12, the shift operating unit 38 is mounted on the main body 30 of the bracket 26. The shift operating unit 38 basically includes a first operating member 54, a second operating member 56 and a cable take-up member or spool 58. The take-up member 58 and the first and second operating members 54 and 56 are coaxially arranged on a main shift axle 60 of the shift operating unit 38. The main shift axle 60 defines a main pivot axis A of the shift operating unit 38. The main shift axle 60 pivotally supports the take-up member 58 and the first and second operating members 54 and 56 to the bracket 26 for rotation on the main pivot axis A (FIG. 14). In the first embodiment, the main pivot axis A is angled with respect to the shift axes P2 and P3 as viewed in a direction parallel to the brake pivot axis P1. Basically, the take-up member 58 pivots in opposite rotational directions about the main pivot axis A in response to operation of the first and second operating members 54 and 56 as discussed below.

In the illustrated embodiment, the take-up member 58 is biased in a first rotational direction R1 (FIG. 17) by a biasing element 62. The take-up member 58 constitutes a wire winding body or moving member. The take-up member 58 is pivotally supported on the main shift axle 60 to pivot with respect to the bracket 26 (e.g., the fixed member) in the first rotational direction R1 in response to the movement of the first operating member 54. Also the take-up member 58 is pivotally supported on the main shift axle 60 to pivot with respect to the bracket 26 (e.g., the fixed member) in a second rotational direction R2 in response to the movement of the second operating member 56. The first rotational direction R1 is an opposite rotational direction from the second rotational direction R2 with respect to the main pivot axis A.

Figure 17:
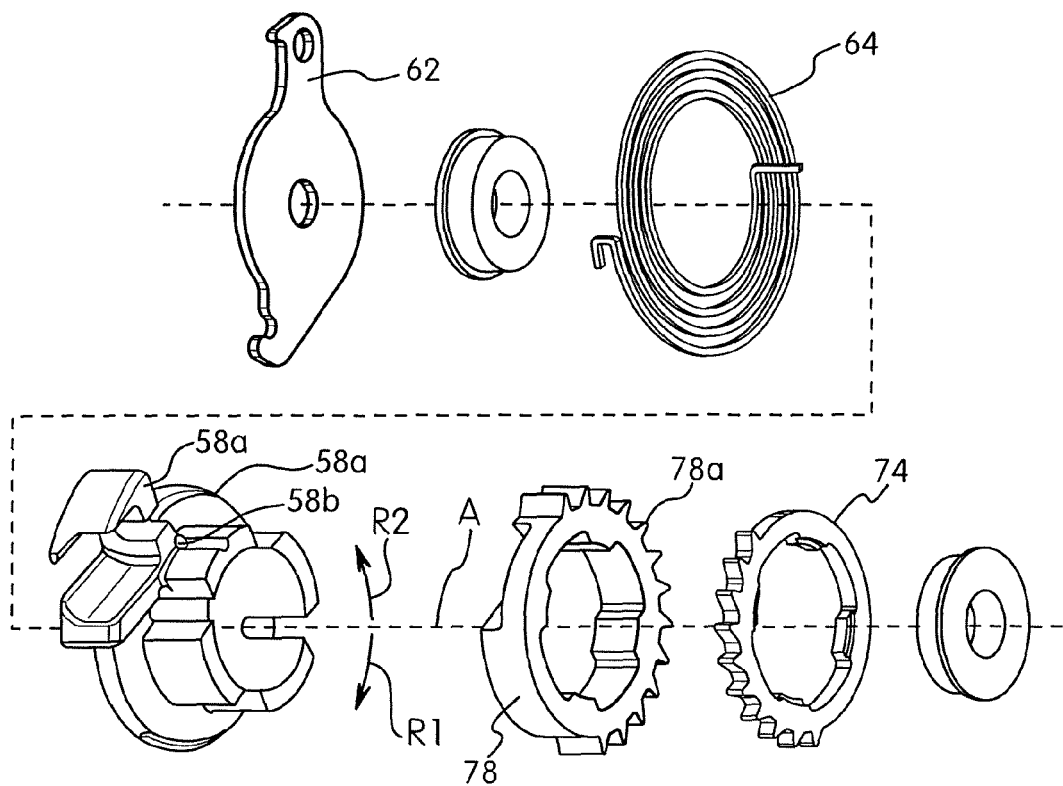
FIG. 17 is an exploded front perspective view of selected parts of the shift operating unit of the right hand side shift operating device.

As best seen in FIG. 17, the take-up member 58 has a shift wire attachment structure 58a for attaching the inner wire 21a of the cable 21 thereto. Rotation of the take-up member 58 in the first rotational direction R1 results in the inner wire 21a of the cable 21 being unwound from the peripheral edge of the take-up member 58. Conversely, rotation of the take-up member 58 in the second rotational direction R2 results in the inner wire 21a of the cable 21 being wound on the peripheral edge of the take-up member 58.

Operation of the first operating member 54 causes the take-up member 58 to move in the first rotational direction R1 for releasing the inner wire 21a. The first operating member 54 is operated by the rider pivoting the shift lever 36 about the shift pivot axis P3. In particular, the first operating member 54 has a contact member or flange 54a that is contacted by the shift lever 36 such that the first operating member 54 is pivoted in response to pivotally movement of the shift lever 36. As a result, the shift lever 36 is operatively coupled to the shift operating unit 38 to perform a cable releasing operation of the take-up member 58. In the illustrated embodiment, the first operating member 54 is pivoted in the second rotational direction R2 with respect to the main pivot axis A of the take-up member 58 by the shift lever 36 to selectively operate the take-up member 58 in the first rotational direction R1. As explained below, the shift lever 36 and the first operating member 54 are biased in the first rotational direction R1 to their respective rest positions such that the shift lever 36 and the first operating member 54 return to their respective rest positions after the shift lever 36 is released.

On the other hand, operation of the second operating member 56 causes the take-up member 58 to move in the second rotational direction R2 for pulling the inner wire 21a. The second operating member 56 is operated by the rider pivoting the brake/shift lever 34 about the shift pivot axis P2. In particular, the second operating member 56 has a connecting member 63 (FIGS. 9, 12 and 13) that is contacted by the brake/shift lever 34 such that the second operating member 56 is pivoted in response to pivotally movement of the brake/shift lever 34. The connecting member 63 is pivotally mounted at one end to the second operating member 56 by a hinge connection and biased into slidably engagement with a rearward facing surface of the brake/shift lever 34 at the other end. As seen in FIG. 10, an attachment member 34a is provided on the rearward facing surface of the brake/shift lever 34 to slidably retain the lower end of the connecting member 63 to the brake/shift lever 34. Thus, the connecting member 63 can pivot in a rearward direction when the brake/shift lever 34 is pivoted in the rearward direction to perform a braking operation while the connecting member 63 still remains attached to the brake/shift lever 34. In this way, the connecting member 63 connects the brake/shift lever 34 to the shift operating unit 38. As a result, the brake/shift lever 34 is operatively coupled to the shift operating unit 38 to perform a cable pulling or winding operation of the take-up member 58.

In the illustrated embodiment, the second operating member 56 is pivoted in the second rotational direction R2 with respect to the main pivot axis A of the take-up member 58 by the brake/shift lever 34 to selectively operate the take-up member 58 in the second rotational direction R2. As explained below, the brake/shift lever 34 and the second operating member 56 are biased in the first rotational direction R1 to their respective rest positions such that the brake/shift lever 34 and the second operating member 56 return to their respective rest positions after the brake/shift lever 34 is released.

As seen in FIGS. 14 to 19, the shift operating unit 38 further includes a rear stationary plate 64, a middle stationary plate 66 and a front stationary plate 68. The stationary plates 64, 66 and 68 are rigid members that are all mounted on the main shift axle 60. The stationary plates 64, 66 and 68 are non-movable with respect to the main body 30 of the bracket 26. The rear stationary plate 64 is fixed to the middle stationary plate 66 by a pivot pin 69, while the front stationary plate 68 is fixed to the middle stationary plate 66 by a stop pin 70. Thus, the stationary plates 64, 66 and 68 are fixed together and contact the main body 30 of the bracket 26 such that the stationary plates 64, 66 and 68 are held stationary by the main body 30.

The rear stationary plate 64 provides an attachment point for the biasing element 62 of the take-up member 58. In particular, the biasing element 62 is a torsion spring that has a first end hooked on the rear stationary plate 64 and a second end coupled to the take-up member 58. Regarding the second end of the biasing element 62, the take-up member 58 has a hole 58b (FIG. 15) for receiving the second end of the biasing element 62. Thus, the biasing element 62 biases the take-up member 58 in the first rotational direction R1.

The stop pin 70 is mounted between the middle stationary plate 66 and the front stationary plate 68. The stop pin 70 acts as a stop for the second operating member 56. In particular, the stop pin 70 limits rotation of the second operating member 56 in the first rotational direction R1 to establish the rest position of the second operating member 56. In the illustrated embodiment, the first operating member 54 is biased against the second operating member 56 by a biasing element 72, while the second operating member 56 is biased against the stop pin 70 by the biasing element 48 that is provided between the brake/shift lever 34 and the support member 40. Of course, it will be apparent from this disclosure that an additional biasing element can be provided for biasing the second operating member 56 to its rest position as needed and/or desired. The biasing element 72 is provided between the front stationary plate 68 and the first operating member 54. As mentioned above, the biasing element 72 is arranged for biasing the first operating member 54 to its rest position against the second operating member 56. In the illustrated embodiment, the biasing element 72 is a torsion spring with its coiled portion disposed on the main shift axle 60 and its first and second free ends contacting the first operating member 54 and the front stationary plate 68, respectively.

Referring to FIGS. 14 to 19, the shift operating unit 38 further includes a pulling ratchet or plate 74, a pulling pawl 76, a positioning ratchet or plate 78, a positioning pawl 80, a stopping pawl 82, a release member or plate 84 and a release pawl 86. The positioning ratchet 78, the positioning pawl 80, the stopping pawl 82 and the release member 84 of the shift operating unit 38 constitutes a shift positioning mechanism that selectively maintains the take-up member 58 in any one of a plurality of different shift positions. The positioning pawl 80 and the stopping pawl 82 are pivotally mounted on the pivot pin 69 that defines a first rotational axis B. The pulling ratchet 74, the positioning ratchet 78 and the release member 84 are pivotally mounted on the main shift axle 60 that defines the main pivot axis A (e.g., a second rotational axis) that is offset from the first rotational axis B. The release pawl 86 and the pulling pawl 76 release pawl 86 and are pivotally mounted on the first and second operating members 54 and 56, respectively, by pivot pins 92 and 90 that define a third and fourth rotational axis that are offset from each other and offset from the first and rotational axes.

Basically, the positioning pawl 80 moves between a holding position and a non-holding position. In the holding position, the positioning pawl 80 holds the take-up member 58 from moving in the first rotational direction R1 by selectively engaging the positioning ratchet 78. In the non-holding position, the positioning pawl 80 is disengaged from the positioning ratchet 78 by the release member 84. The stopping pawl 82 selectively moves between a non-stop or unrestricting position and a stop position. In the non-stop (rest) position, the stopping pawl 82 is located out of the path of one of the positioning ratchet 78. In the stop position, the stopping pawl 82 is located along the path of the positioning ratchet 78 by the release member 84 to catch and hold the take-up member 58 from moving in the first rotational direction R1. A stopping tooth 82a of the stopping pawl 82 moves closer to the rotational axis of main shift axle 60 as the stopping pawl 82 rotates from the non-stop position or unrestricting position to the stop position. The releasing member 84 is movably arranged between a non-releasing position and a releasing position such that the releasing member 84 rotates the positioning pawl 80 and the stopping pawl 82. The releasing member 84 rotates the positioning pawl 80 and the stopping pawl 82 such that the stopping tooth 82a of the stopping pawl 82 starts to move from the non-stop position to the stop position prior to a positioning tooth 80a of the positioning pawl 80 starting to move from the holding position to the non-holding position.

The pulling ratchet 74, the positioning ratchet 78 and the release member 84 are coaxially arranged with the take-up member 58 on the main shift axle 60. The pulling ratchet 74 and the positioning ratchet 78 are arranged to rotate with the take-up member 58 on the main shift axle 60, while the release member 84 rotates relative to the take-up member 58 on the main shift axle 60. As explained below, the pulling pawl 76 selectively engages the pulling ratchet 74 to rotate the take-up member 58 on the main shift axle 60 in the second rotational direction R2 in response to operation of the second operating member 56. The positioning pawl 80 and the stopping pawl 82 selectively engage the positioning ratchet 78 to hold the take-up member 58 from rotating on the main shift axle 60 in the first rotational direction R1. The release pawl 86 selectively engages the release member 84 to rotate the release member 84 on the main shift axle 60 in the second rotational direction R2 in response to operation of the first operating member 54. Rotation of the release member 84 results in the release member 84 selectively moving such that the positioning pawl 80 and the stopping pawl 82 to selectively release the positioning ratchet 78.

In illustrated embodiment, the pulling pawl 76 is pivotally mounted on the second operating member 56 by the pivot pin 90, while the release pawl 86 is pivotally mounted on the first operating member 54 by the pivot pin 92. A biasing element 94 is provided between the second operating member 56 and the pulling pawl 76 for biasing the pulling pawl 76 into engagement with the pulling ratchet 74. A biasing element 96 is provided between the first operating member 54 and the release pawl 86 for biasing the release pawl 86 towards engagement with the release member 84. In the illustrated embodiment, the biasing elements 94 and 96 are torsion springs. The biasing element 94 has its coiled portion disposed on the pivot pin 90 and its first and second free ends contacting the second operating member 56 and the pawl pulling pawl 76, respectively. Similarly, the biasing element 96 has its coiled portion disposed on the pivot pin 92 and its first and second free ends contacting the first operating member 54 and the release pawl 86, respectively.

Figure 19:
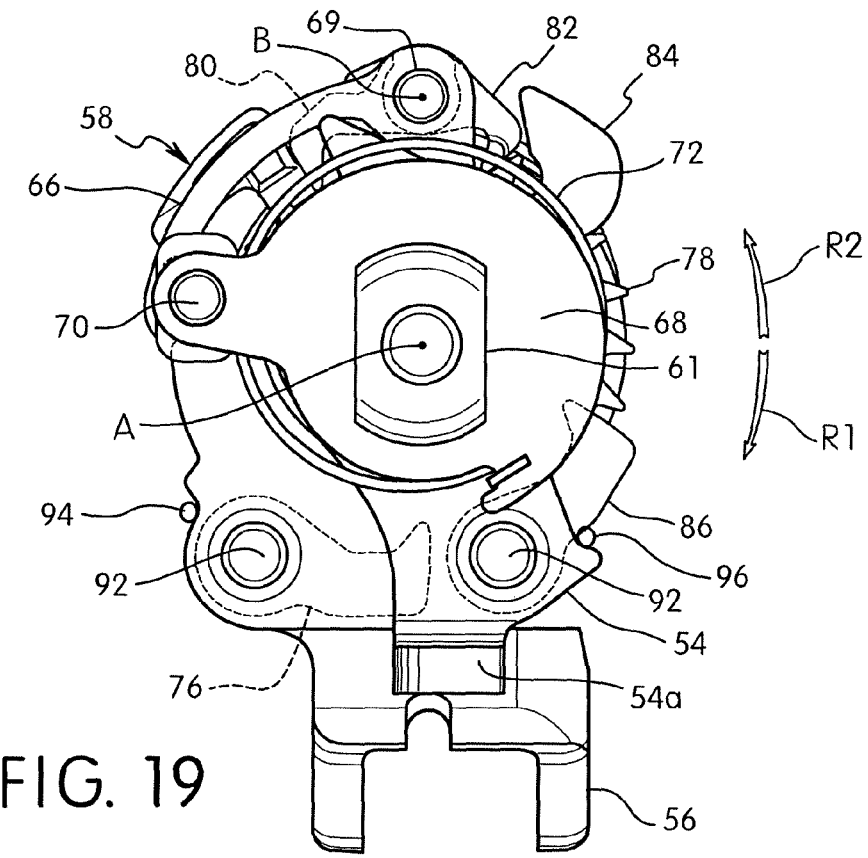
FIG. 19 is a front side view of selected parts of the shift operating unit as viewed along the center axis of the main shift unit axle, with the shift operating unit being in a fully released position.
Figure 20:
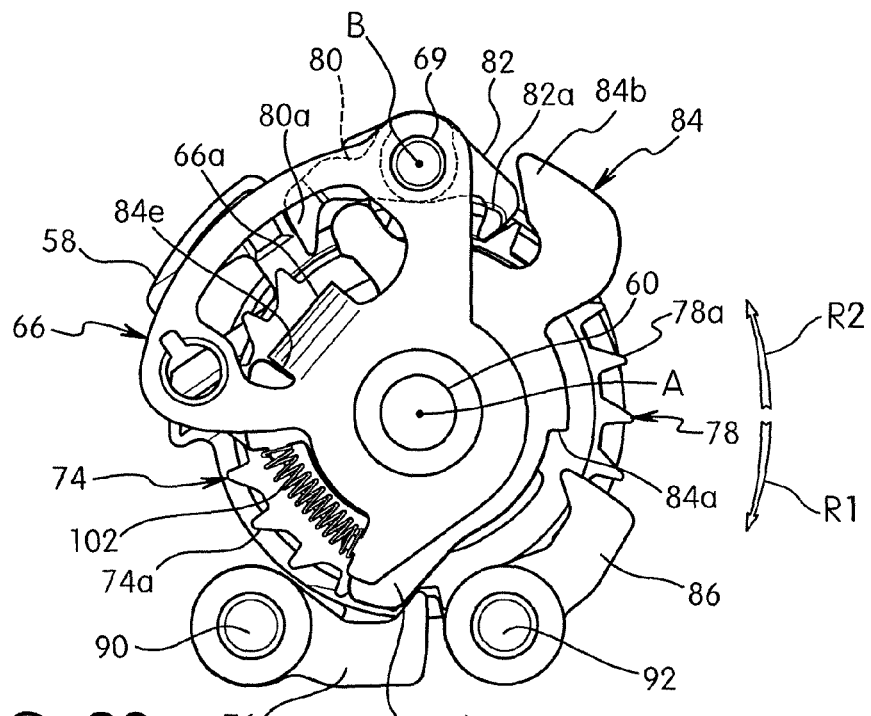
FIG. 20 is a front side view of selected parts of the shift operating unit as viewed along the center axis of the main shift unit axle, with the shift operating unit being in a fully released position.
Figure 21:
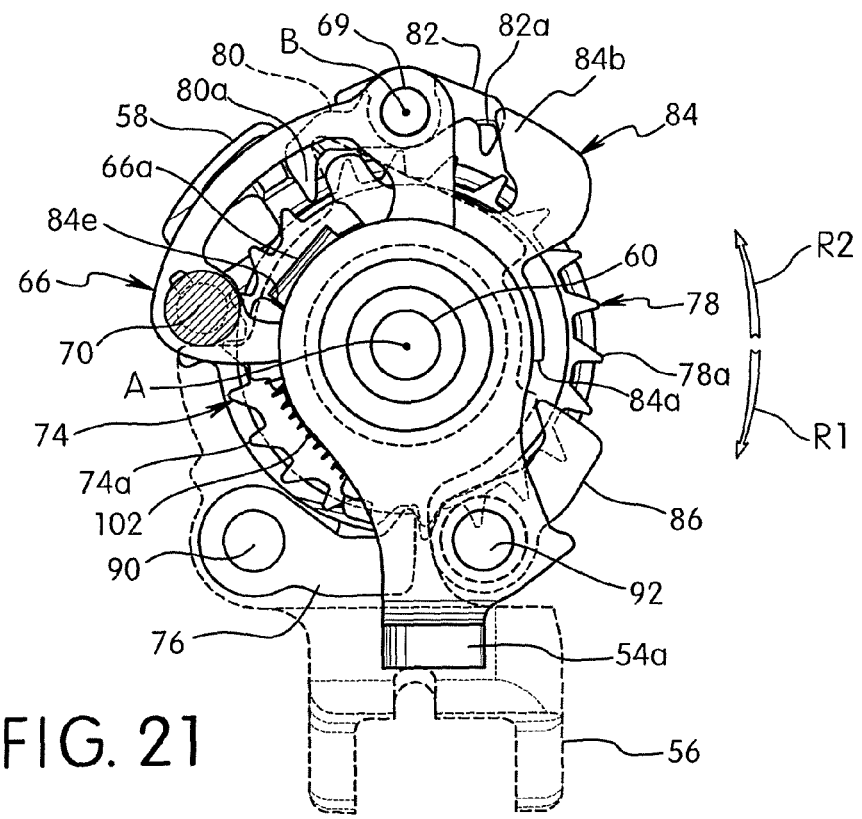
FIG. 21 is a front side view of selected parts of the shift operating unit as viewed along the center axis of the main shift unit axle, with the shift operating levers in their rest positions.
Figure 31:
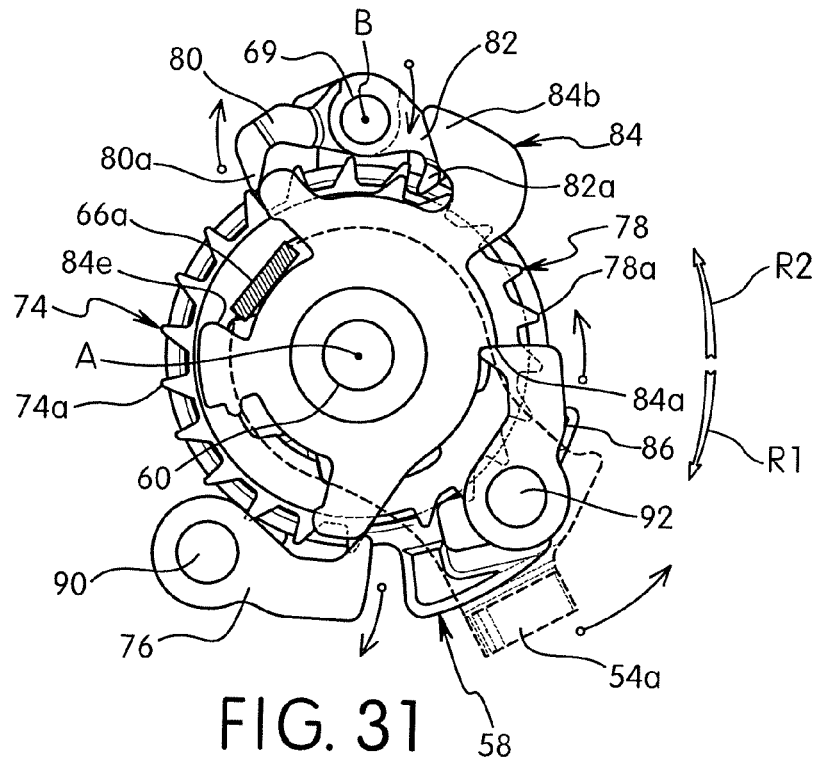
FIG. 31 is a front side view of the selected parts of the shift operating unit illustrated in FIGS. 20 to 30, but with the release operating member being rotated further to start move the positioning pawl out of the path of the positioning teeth.

With the shift operating unit 38 in the rest position, as seen in FIGS. 19 and 21, the pulling pawl 76 is biased into contact with the pulling ratchet 74 and the release pawl 86 is biased into contact with a peripheral edge of a mounting portion of the second operating member 56. As a result, the release pawl 86 is disengaged from the release member 84 while the first and second operating members 54 and 56 are in its rest position. Also since the first and second operating members 54 and 56 move together when the second operating member 56 is rotated in the second rotational direction R2 to perform a cable pulling operation (FIGS. 21 to 24), the release pawl 86 remains in contact with the peripheral edge of the second operating member 56 during a cable releasing operation. In contrast, during a cable releasing operation (FIGS. 28 to 33), the first operating member 54 in the second rotational direction R2) while the second operating member 56 remains in its rest position. As a result, the release pawl 86 moves off the peripheral edge of the second operating member 56 and into engagement with the release member 84 as seen in FIG. 29. Also during a cable releasing operation, movement of the release member 84 by the first operating member 54 causes the release member 84 disengage the pulling pawl 76 from the pulling ratchet 74 as seen in FIG. 31.

Figure 18:
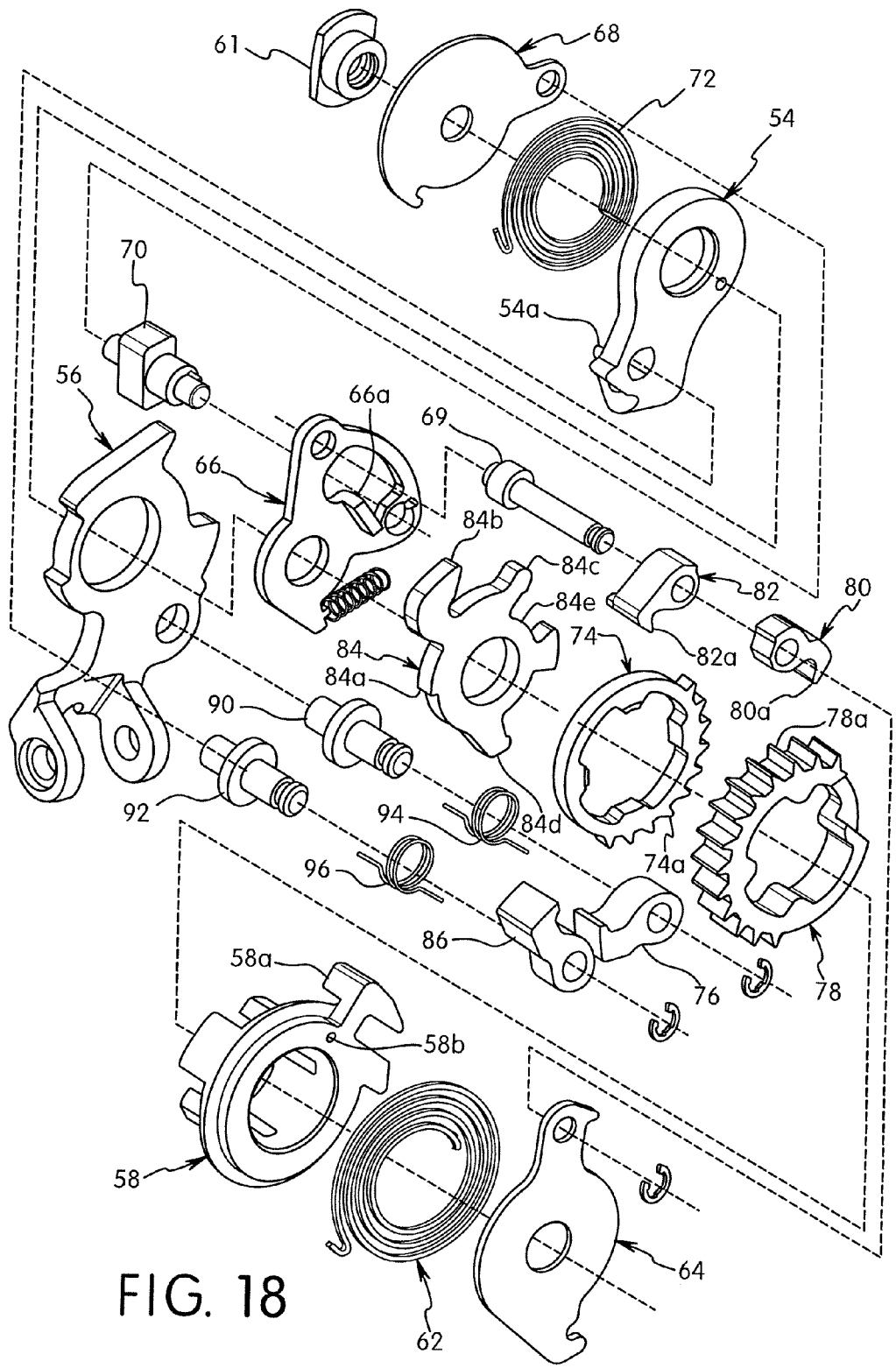
FIG. 18 is an exploded rear perspective view of selected parts of the shift operating unit of the right hand side shift operating device.

The pulling ratchet 74 will now be discussed now with respect to FIGS. 14, 17 and 18. The pulling ratchet 74 is a rigid ring shaped member that is fixedly coupled to the take-up member 58 to pivot with the take-up member 58 on the main shift axle 60. In particular, the pulling ratchet 74 has a noncircular opening that mates with a corresponding noncircular hub of the take-up member 58. While the take-up member 58 and the pulling ratchet 74 are shown as separate members, it will be apparent from this disclosure that the take-up member 58 and the pulling ratchet 74 can be a one-piece, unitary member as needed and/or desired. In any event, the take-up member 58 and the pulling ratchet 74 are pivotally mounted as a unit on the main shift axle 60. The pulling ratchet 74 has a peripheral edge that is provided with a plurality of pull teeth 74a. The pulling pawl 76 selectively engages the pull teeth 74a to move the pulling ratchet 74 response to the movement of the second operating member 56. In particular, the pulling pawl 76 selectively engages one of the pull teeth 74a to rotate the pulling ratchet 74 in the second rotational direction R2, which results in the take-up member 58 also rotating in the second rotational direction R2.

The positioning ratchet 78 will now be discussed in more detail. As best seen in FIGS. 14, 17 and 18, the positioning ratchet 78 is a rigid ring shaped member that is fixedly coupled to the take-up member 58 to pivot with the take-up member 58 on the main shift axle 60. In other words, the positioning ratchet 78 constitutes a positioning member that rotates with the take-up member 58. While the take-up member 58 and the positioning ratchet 78 are shown as separate members, it will be apparent from this disclosure that the take-up member 58 and the positioning ratchet 78 can be a one-piece, unitary member as needed and/or desired. In the illustrated embodiment, the positioning ratchet 78 has a noncircular opening that mates with a corresponding noncircular hub of the take-up member 58 so that the positioning ratchet 78 rotates with the take-up member 58. The positioning ratchet 78 includes a plurality of positioning teeth 78a that forms an abutment or stop for selectively being engaged with the positioning tooth 80a of the positioning pawl 80 and a stopping tooth 82a of the stopping pawl 82. The positioning teeth 78a of the positioning ratchet 78 move along a movement path such that the positioning pawl 80 and the stopping pawl 82 selectively move into and out of the movement path of the positioning teeth 78a to control the movement of the positioning ratchet 78. The stopping tooth 82a of the stopping pawl 82 and the positioning tooth 80a of the positioning pawl 80 are disposed at opposite sides of the first rotational axis defined by the pivot pin 69 with respect to the movement path of the positioning teeth 78a. The stopping tooth 82a of the stopping pawl 82 and the positioning tooth 80a of the positioning pawl 80 are disposed with respect to the first rotational axis defined by the pivot pin 69. In such a configuration, a distance between a positioning ratchet contact surface of the stopping tooth 82a of the stopping pawl 82 and a positioning ratchet contact surface of the positioning tooth 80a of the positioning pawl 80 is larger than a distance from the first rotational axis defined by the pivot pin 69 to the positioning ratchet contact surface of the stopping tooth 82a and a distance from the first rotational axis to the positioning ratchet contact surface of the positioning tooth 80a.

More specifically, the stopping pawl 82 is moved into the path of one of the positioning teeth 78a of the positioning ratchet 78 by the release member 84 to selectively engage and stop movement of the positioning ratchet 78 in response to the movement of the first operating member 54 during a cable releasing operation. The stopping pawl 82 engages one of the positioning teeth 78a of the positioning ratchet 78 during rotation of the positioning ratchet 78 in the first rotational direction R1 in response to a single operation of the first operating member 54 such that the positioning ratchet 78 and the take-up member 58 both momentarily stop in a position between two adjacent shift positions.

On the other hand, during a cable releasing operation, the positioning pawl 80 is disengaged from the positioning teeth 78a of the positioning ratchet 78 by the release member 84 to release the take-up member 58. In other words, with the shift operating unit 38 in the rest position, the positioning pawl 80 normally is engaged with one of the positioning teeth 78a of the positioning ratchet 78 to hold the take-up member 58 from moving in the first rotational direction R1.

However, in the fully released position of the take-up member 58, as seen in FIG. 19, the positioning pawl 80 is not engaged with one of the positioning teeth 78*a* of the positioning ratchet 78 because the take-up member 58 is at an end position in which the take-up member 58 cannot rotate farther in the first rotational direction R1. In any case, the positioning pawl 80 selectively engages the positioning teeth 78*a* to selectively maintain the take-up member 58 in the desired shift positions. When the release member 84 is rotated by the first operating member 54 during a cable releasing operation, the release member 84 disengages the positioning pawl 80 from the positioning teeth 78*a* of the positioning ratchet 78 so that the take-up member 58 can rotate in the first rotational direction R1. However, as mentioned above, prior to the positioning pawl 80 being disengaged from the positioning teeth 78*a* of the positioning ratchet 78, the release member 84 moves the stopping pawl 82 into the path of the positioning teeth 78*a* of the positioning ratchet 78 to engage and stop the rotation of the positioning ratchet 78. In this way, the take-up member 58 is rotated in the first rotational direction R1 by only a single shift position.

Figure 16:
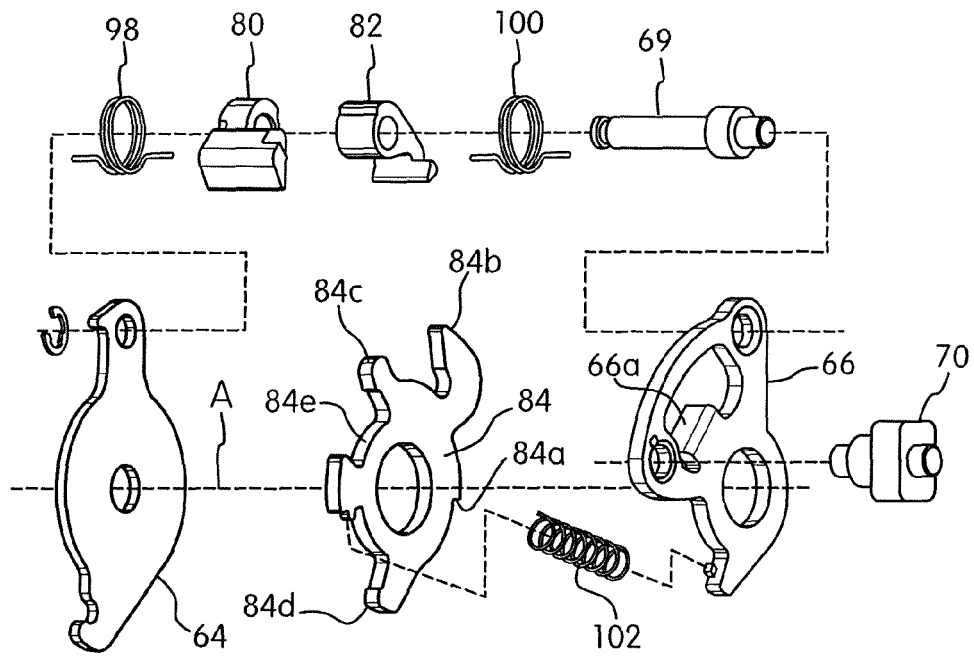
FIG. 16 is an exploded front perspective view of selected parts of the shift operating unit of the right hand side shift operating device.

The release member 84 will now be discussed in more detail. As best seen in FIGS. 14, 16 and 18, the release member 84 is a rigid ring shaped member that is pivotally supported on the main shift axle 60. The release member 84 is not limited to a plate like member as illustrated. The release member 84 can have a different configuration as needed and/or desired. Thus, the release member 84 selectively moves the positioning pawl 80 and the stopping pawl 82 to selectively release the positioning ratchet 78 by only a single shift position at a time. In any case, in the illustrated embodiment, the release member 84 is configured and arranged to rotate relative to the take-up member 58 on the main shift axle 60. As mentioned above, the release member 84 is movably supported to operatively release the take-up member 58. The release member 84 is biased to a rest position by a biasing element 102. In the illustrated embodiment, the biasing element 102 is a coil spring that is preloaded in a slightly compressed state to bias the release member 84 to its rest position. Thus, the release member 84 is movably arranged between a non-releasing position that corresponds to the rest position and a releasing position that rotates the positioning pawl 80 and the stopping pawl 82.

The release member 84 includes an operating tooth 84*a* that is selectively engaged by the release pawl 86. More specifically, the release pawl 86 selectively engages the operating tooth 84*a* to move the release member 84 in response to the movement of the first operating member 54. This movement of the release member 84 moves the positioning pawl 80 and the stopping pawl 82 for controlling movement of the positioning ratchet 78. In particular, the release member 84 includes a first pawl operating projection 84*b*, a second pawl operating projection 84*c* and a third pawl operating projection 84*d*. These pawl operating projection 84*b*, 84*c* and 84*d* for controlling movement of the positioning ratchet 78 such that the take-up member 58 is selectively maintained in the desired shift position. The release member 84 also includes a cutout 84*e* that receives a tab 66*a* of the middle stationary plate 66 for limiting rotation of the release member 84.

More specifically, the first pawl operating projection 84*b* is configured and arranged to pivot the stopping pawl 82 into the path of one of the positioning teeth 78*a* to momentarily stop rotation of the positioning ratchet 78 in the first rotational direction R1 during a cable releasing operation of the first operating member 54. In other words, the first pawl operating projection 84*b* forms a first contact portion that contacts the stopping pawl 82 while the release member 84 is moved to the releasing position such that the stopping pawl 82 pivots to catch one of the positioning teeth 78*a*. In particular, the stopping tooth 82*a* of the stopping pawl 82 is moved closer to the main pivot axis A of the main shift axle 60 as the stopping pawl 82 rotates from the non-stop position to the stop position by the release member 84. The second pawl operating projection 84*c* is configured and arranged to pivot the positioning pawl 80 out of the path of the positioning teeth 78*a*. In other words, the second pawl operating projection 84*c* forms a second contact portion that contacts the positioning pawl 80 while the release member 84 is moved to the releasing position such that the positioning pawl 80 pivots out of engagement with the positioning teeth 78*a*. In particular, the positioning tooth 80*a* of the positioning pawl 80 moves farther from the main pivot axis A of the main shift axle 60 as the positioning pawl 80 rotates from the holding position to the non-holding position by the release member 84. The third pawl operating projection 84*d* is configured and arranged to pivot the pulling pawl 76 out of the path of the pull teeth 74*a*. In other words, the pawl operating projection 84*d* forms a third contact portion that contacts the pulling pawl 76 while the release member 84 is moved to the releasing position such that the pulling pawl 76 pivots out of engagement with the pull teeth 74*a*. As a result of the positioning pawl 80 being pivoted outwardly from the positioning ratchet 78, the positioning ratchet 78 is released for pivotal movement in the first rotational direction R1 during a shifting (releasing) operation by the first operating member 54. Thus, the take-up member 58 can pivot to release a predetermined amount of the inner wire 21*a*. However, prior to the positioning pawl 80 being pivoted outwardly from the positioning ratchet 78, the first pawl operating projection 84*b* pivots the stopping pawl 82 into the path of the positioning teeth 78*a*. As a result, the stopping pawl 82 catches one of the positioning teeth 78*a* to momentarily stop rotation of the positioning ratchet 78 in the first rotational direction R1 during a cable releasing operation by the first operating member 54. When the first operating member 54 is released, the first operating member 54 and the release member 84 return to the rest position. As a result, the positioning pawl 80 moves back into the path of the positioning teeth 78*a* and the stopping pawl 82 subsequently moves out of the path of the positioning teeth 78*a*. Thus, the stopping pawl 82 releases the positioning ratchet 78 after the positioning pawl 80 has moved back into the path of the positioning teeth 78*a*. In this way, the stopping pawl 82 releases the positioning ratchet 78 so that the positioning pawl 80 engages one of the positioning teeth 78*a* to stop rotation of the positioning ratchet 78 in the first rotational direction R1.

The positioning pawl 80 and the stopping pawl 82 are pivotally mounted on the pivot pin 69 to selectively control the movement of the positioning ratchet 78 such that the take-up member 58 is selectively maintained in the desired shift positions. As mentioned above, the pivot pin 69 is mounted to the stationary plates 64 and 66. A first biasing element 98 is mounted on the pivot pin 69 for biasing the positioning pawl 80 into engagement with the positioning ratchet 78. In other words, the positioning pawl 80 is biased towards engagement with the positioning ratchet 78 such that the positioning tooth 80*a* of the positioning pawl 80 contacts the positioning ratchet 78 while the release member 84 is in the non-releasing position. A second biasing element 100 is mounted on the pivot pin 69 for biasing the stopping pawl 82 out of engagement with the positioning ratchet 78.

The stopping pawl 82 is biased out of engagement with the positioning ratchet 78 such that the stopping tooth 82a of stopping pawl 82 separates from the positioning ratchet 78 while the release member 84 is in the non-releasing position. Thus, the positioning pawl 80 and the stopping pawl 82 move independently with respect to each other. Also the pivot pin 69 defines a secondary pivot axis that is offset from the main pivot axis A. In the illustrated embodiment, the release member 84 rotates the positioning pawl 80 and the stopping pawl 82 such that the stopping tooth 82a of the stopping pawl 82 starts to move from the non-stop position to the stop position prior to the positioning tooth 80a of the positioning pawl 80 starting to move from the holding position to the non-holding position.

A cable pulling or winding operation of the shift operating unit 38 will now be discussed with reference primarily to FIGS. 21 to 27. Cable pulling operations of the shift operating unit 38 are performed by the rider pivotally moving the brake/shift lever 34 about the shift pivot axis P2 in the lateral inward direction towards the bicycle longitudinal center plane. The brake/shift lever 34 is operated in a single progressive movement such that in the second operating member 56 moves in a single progressive movement in the second rotational direction R2 from one of the shift or guiding positions to the next adjacent shift or guiding position.

Figure 22:
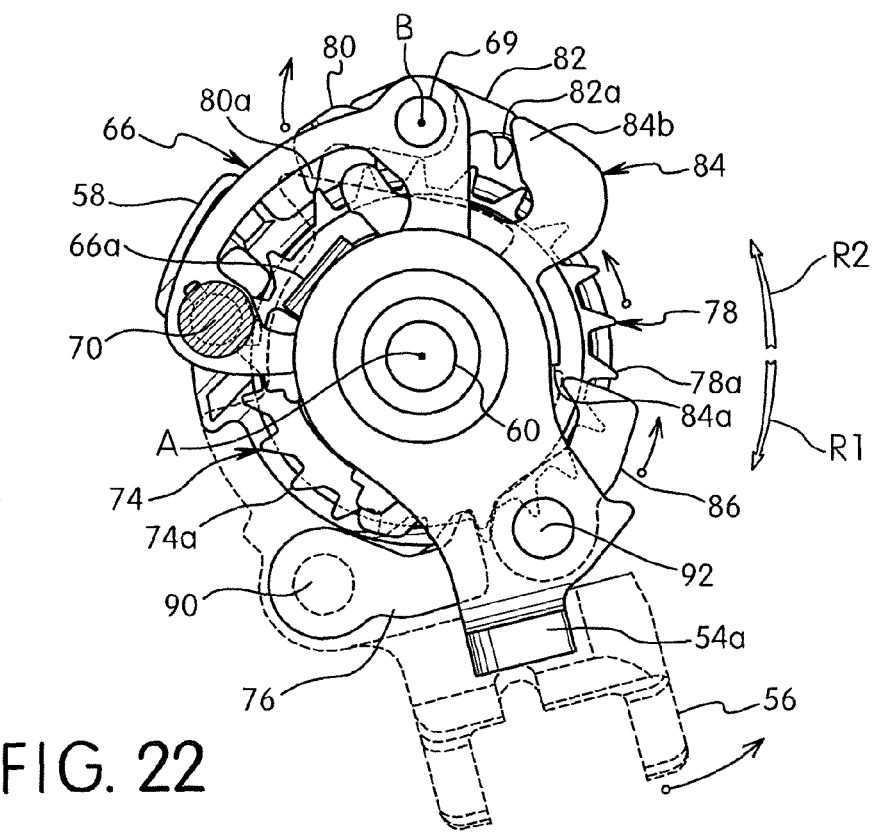
FIG. 22 is a front side view of the selected parts of the shift operating unit illustrated in FIG. 21, but with the pull operating member being rotated from the rest position of FIG. 21 to start a shifting operation that pulls an inner wire of the control cable.
Figure 23:
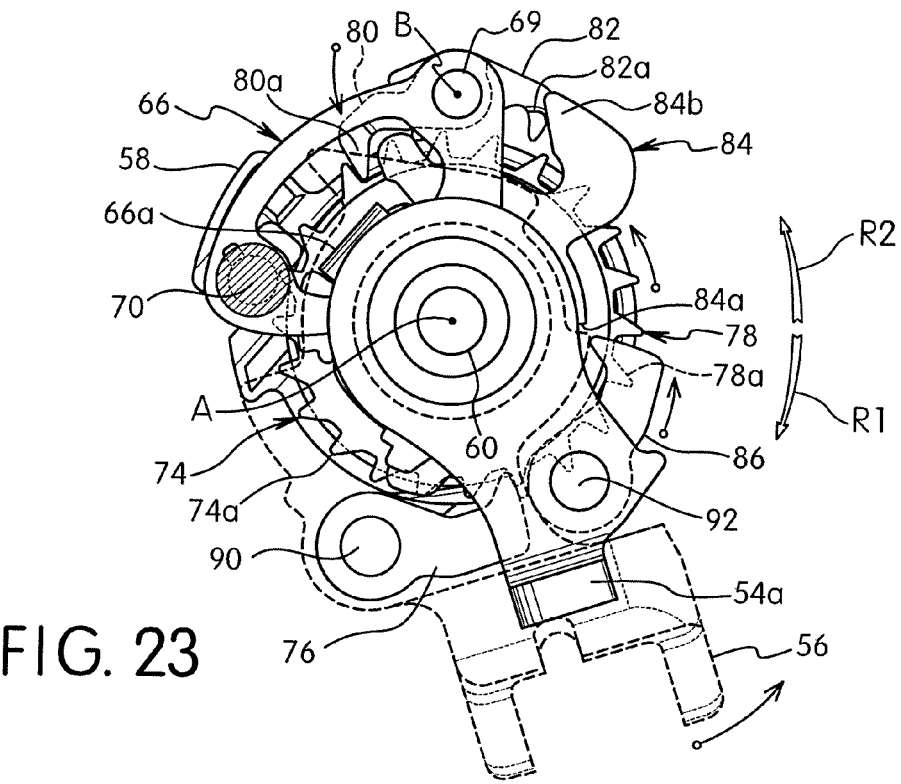
FIG. 23 is a front side view of the selected parts of the shift operating unit illustrated in FIGS. 21 and 22, but with the pull operating member being rotated further from the position of FIG. 22 to perform the shifting operation.
Figure 24:
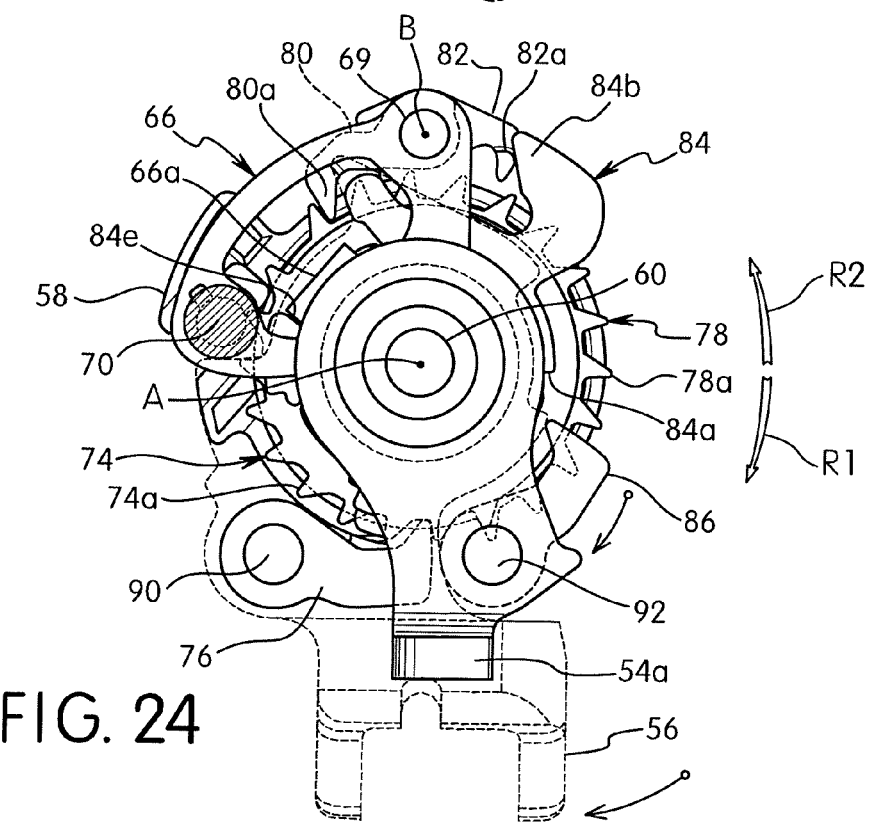
FIG. 24 is a front side view of the selected parts of the shift operating unit illustrated in FIGS. 21 to 23, but with the pull operating member being rotated from the shift operating position of FIG. 23 back to the rest position of FIG. 21 after the shift operating unit has been changed by one shift position.
Figure 25:
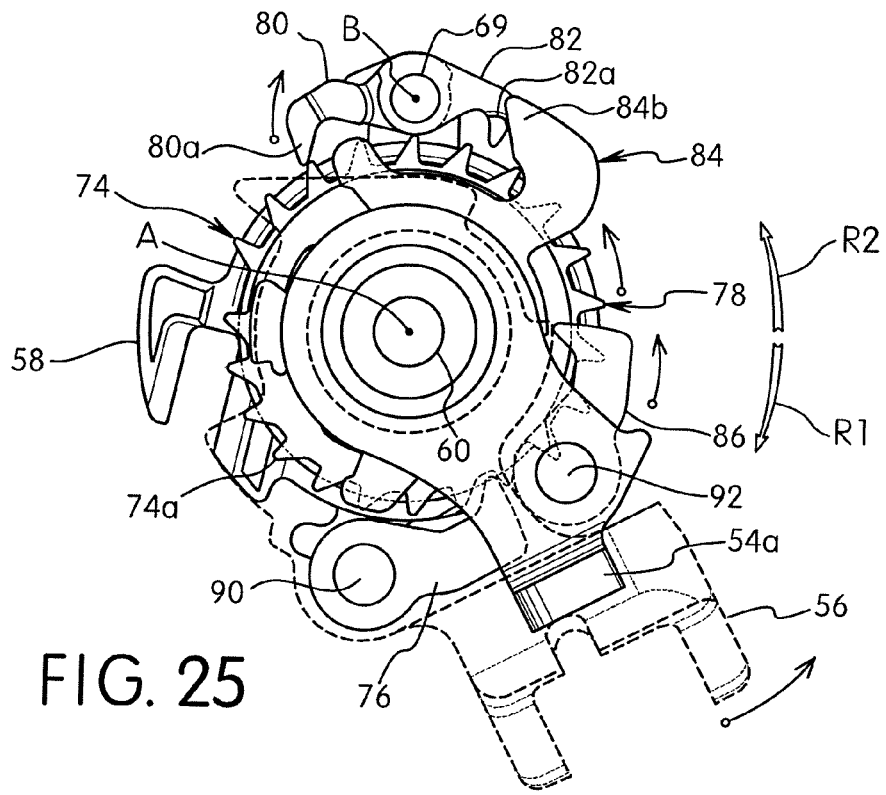
FIG. 25 is a front side view of the selected parts of the shift operating unit illustrated in FIGS. 21 to 24, but with the pull operating member being rotated from the rest position of FIG. 24 to perform a double shifting operation that pulls an inner wire of the control cable.
Figure 26:
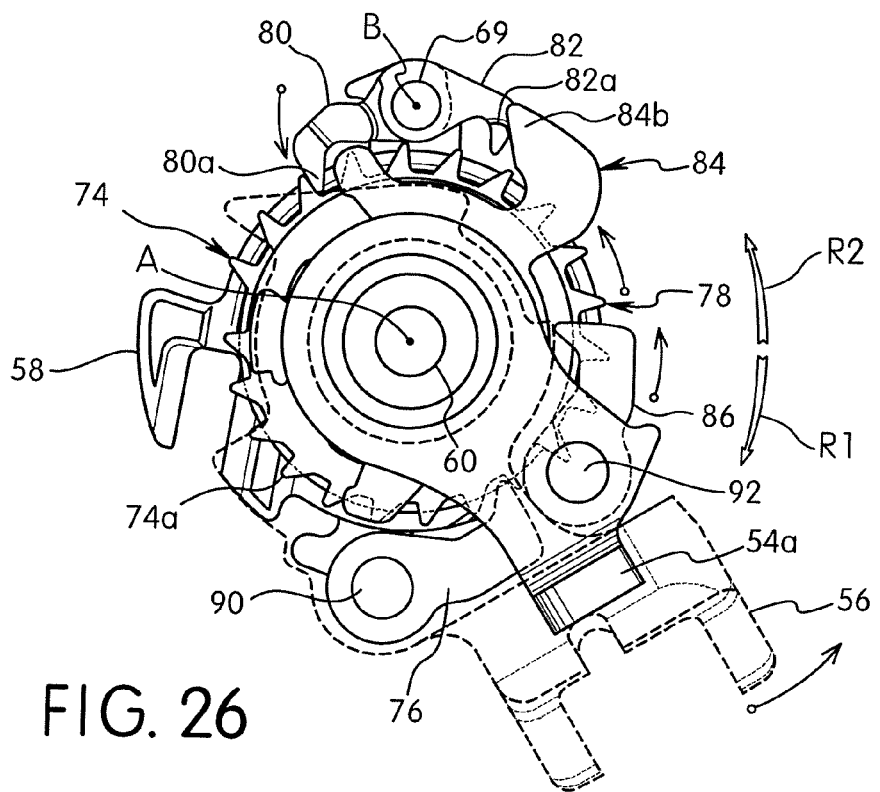
FIG. 26 is a front side view of the selected parts of the shift operating unit illustrated in FIGS. 21 to 25, but with the pull operating member further from the position of FIG. 22 to perform the double shifting operation.
Figure 27:
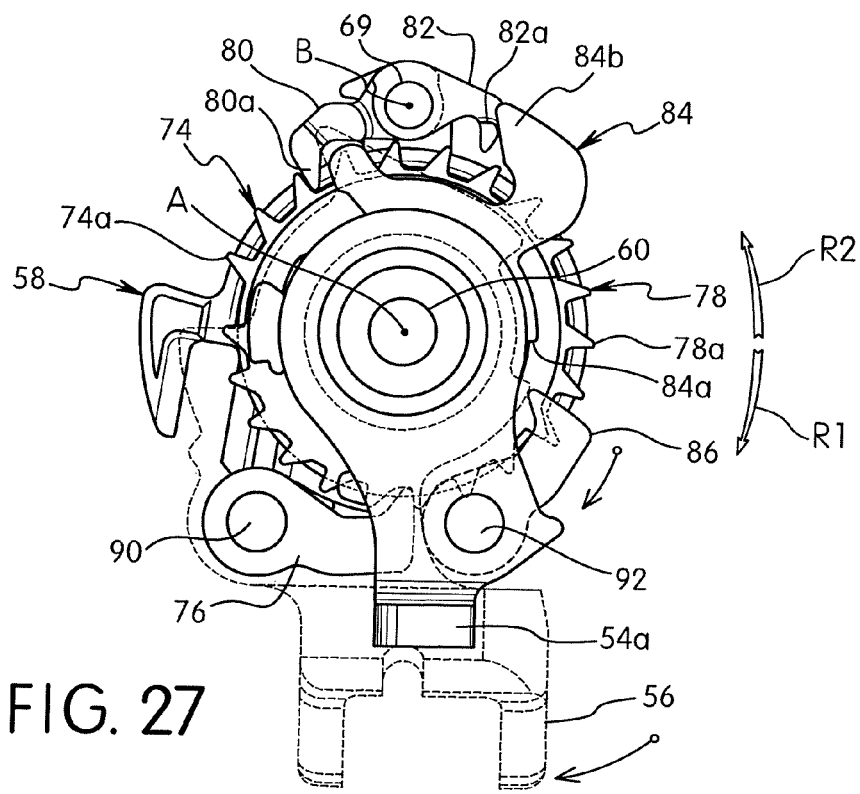
FIG. 27 is a front side view of the selected parts of the shift operating unit illustrated in FIGS. 21 to 26, but with the pull operating member being rotated from the shift operating position of FIG. 26 back to the rest position of FIG. 21 or 24 after the shift operating unit has been changed by two shift positions.

As mentioned above, a cable pulling or winding operation of the shift operating unit 38 is performed by the rider pivotally moving the brake/shift lever 34. This pivotal movement of the brake/shift lever 34 is transmitted to the second operating member 56 via the connecting member 63 such that the second operating member 56 is rotated in the second rotational direction R2 from its rest position (FIG. 21) to its shifting position (FIG. 22). As the second operating member 56 rotates in the second rotational direction R2, the second operating member 56 contacts the release pawl 86 to so that the first and second operating members 54 and 56 move together. As the second operating member 56 rotates in the second rotational direction R2, the pulling pawl 76 engages and pulls one of the pull teeth 74a of the pulling ratchet 74. This engagement of the pulling pawl 76 with one of the pull teeth 74a causes the pulling ratchet 74 to rotate in the second rotational direction R2. Rotation of the pulling ratchet 74 also results in the take-up member 58 and the positioning ratchet 78 to rotate together. Thus, the rotation of the positioning ratchet 78 results in the positioning pawl 80 moving out of engagement with one of the positioning teeth 78a and then engaging another one of the positioning teeth 78a to hold the take-up member 58 in the next desired shift position. When the brake/shift lever 34 is released from the shifting position of FIG. 21, the first and second operating members 54 and 56 return to their rest positions as seen in FIG. 24 and the positioning ratchet 78 is engaged with the positioning pawl 80 to maintain the take-up member 58 in the new shift position. Now, another winding operation of the shift operating unit 38 can be performed by the rider pivotally moving the brake/shift lever 34 about the shift pivot axis P2 in the lateral inward direction towards the bicycle longitudinal center plane. A single shift can be perform a single progressive movement of the brake/shift lever 34 by moving the brake/shift lever 34 a first amount and then releasing the brake/shift lever 34 as seen in FIGS. 21 to 24. Alternatively, by moving the brake/shift lever 34 a second amount that is greater than the first amount and then releasing the brake/shift lever 34, a multiple shift can be perform with a single progressive movement of the brake/shift lever 34 as seen in FIGS. 24 to 27.

A cable releasing operation of the shift operating unit 38 will now be discussed with reference primarily to FIGS. 28 to 33. Cable releasing operations of the shift operating unit 38 are performed by the rider pivotally moving the shift lever 36 about the shift pivot axis P3 in the lateral inward direction towards the bicycle longitudinal center plane. The shift lever 36 is operated in a single progressive movement such that in the first operating member 54 moves in a single progressive movement in the second rotational direction R2 from the current shift position to the next adjacent shift position.

Figure 28:
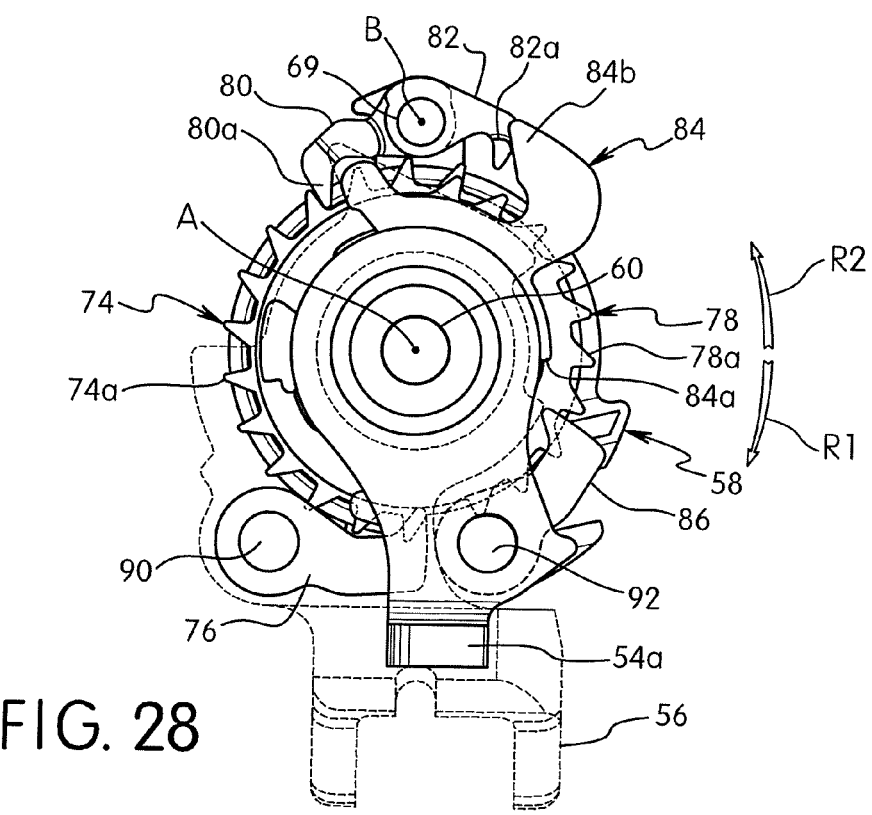
FIG. 28 is a front side view of selected parts of the shift operating unit illustrated in FIGS. 21 to 27, with the shift operating unit in a fully wound position.
Figure 29:
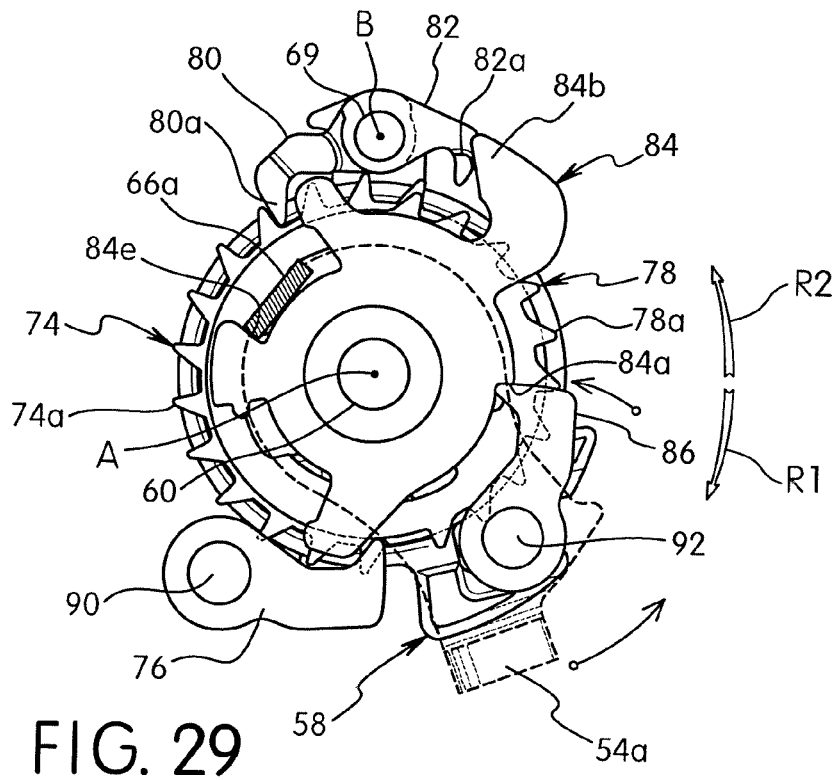
FIG. 29 is a front side view of the selected parts of the shift operating unit illustrated in FIGS. 21 to 28, but with the release operating member being rotated from the rest position of FIG. 28 to start performing a shifting operation that releases an inner wire of the control cable.
Figure 30:
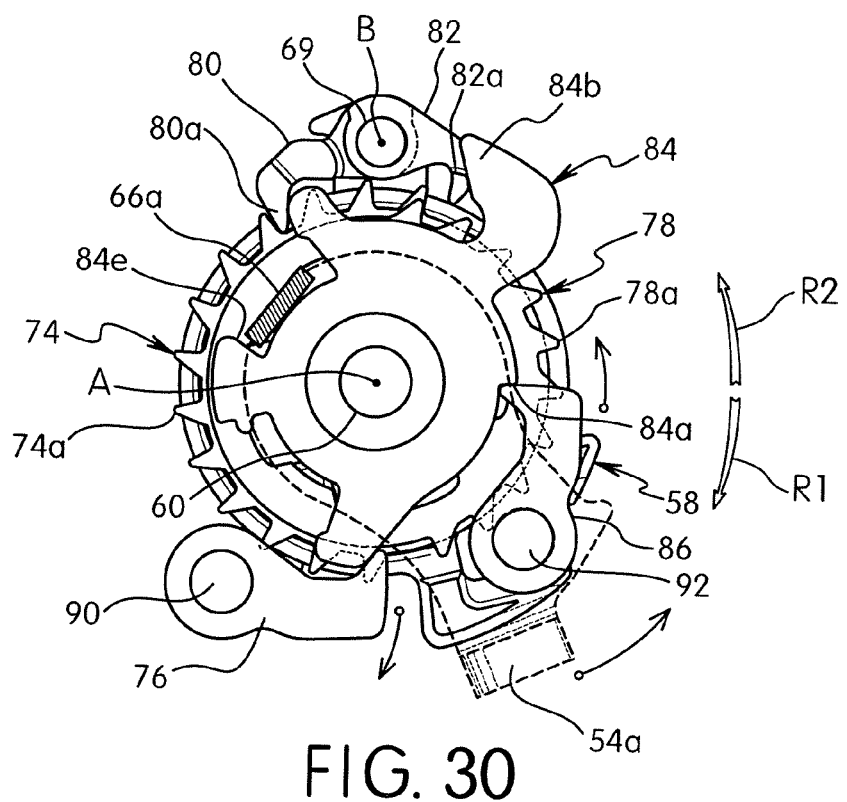
FIG. 30 is a front side view of the selected parts of the shift operating unit illustrated in FIGS. 20 to 29, but with the release operating member being rotated further to move the stopping pawl into the path of the positioning teeth.
Figure 32:
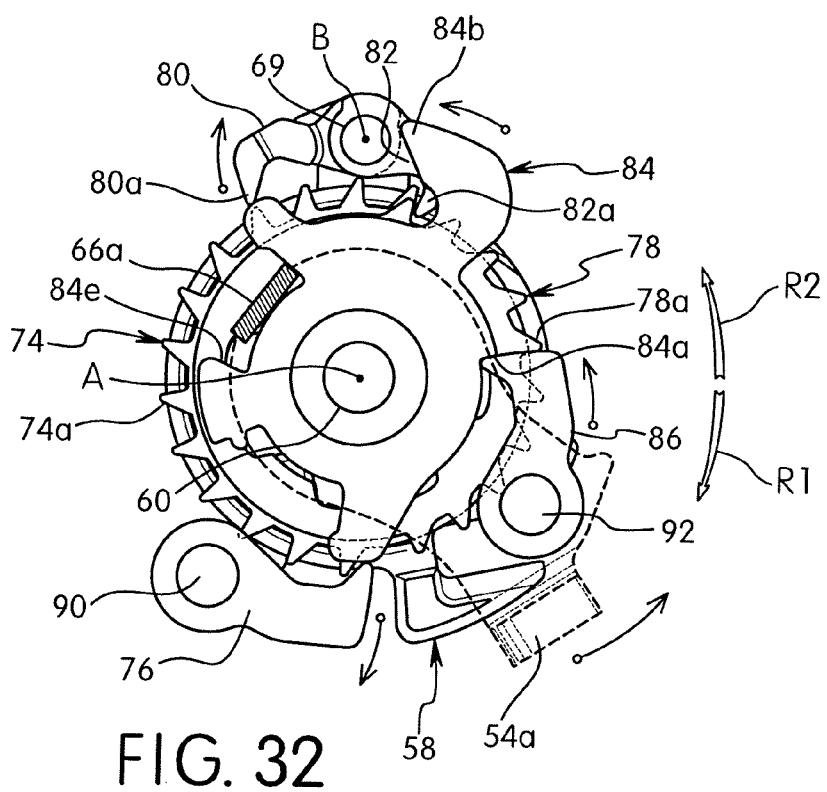
FIG. 32 is a front side view of the selected parts of the shift operating unit illustrated in FIGS. 20 to 31, but with the release operating member being rotated further to completely move the positioning pawl out of the path of the positioning teeth so that the positioning ratchet rotates against the stopping pawl.
Figure 33:
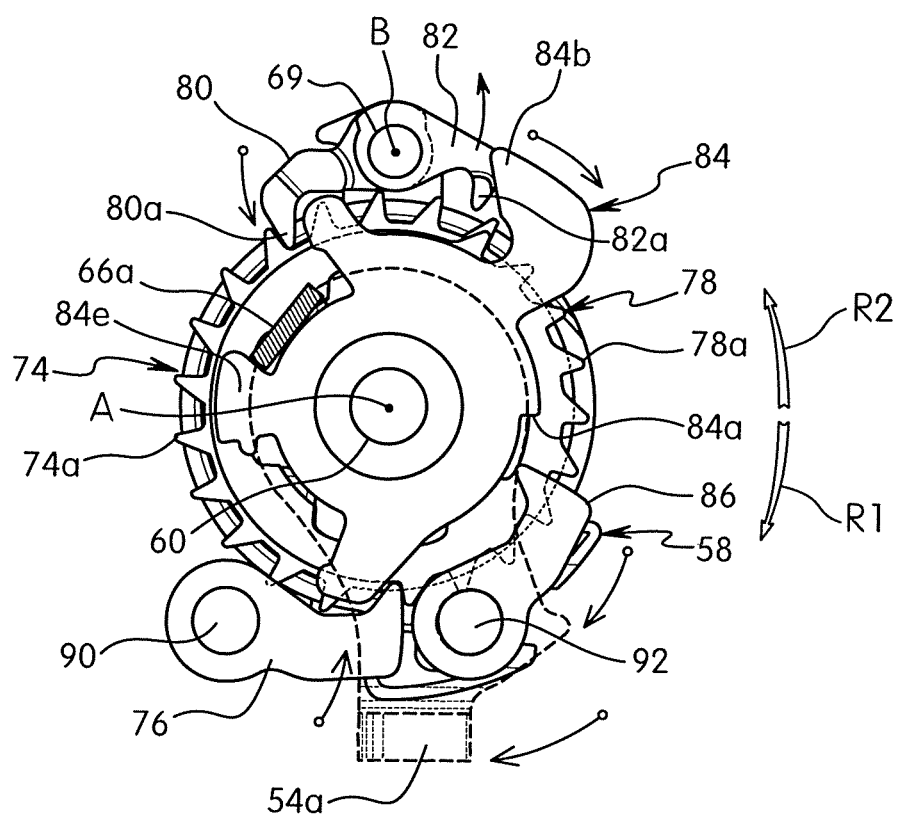
FIG. 33 is a front side view of the selected parts of the shift operating unit illustrated in FIGS. 20 to 32, but with the release operating member being rotated from the shift operating position of FIG. 32 back to the rest position.

As seen in FIG. 28, the shift operating unit 38 is in a fully wound position such that the positioning pawl 80 is contacting the positioning ratchet 78. As mentioned above, a cable releasing operation of the shift operating unit 38 is performed by the rider pivotally moving the shift lever 36. This pivotal movement of the shift lever 36 is transmitted to the first operating member 54 by the shift lever 36 contacting and pushing the contact flange 54a of the first operating member 54 such that the first operating member 54 is rotated in the second rotational direction R2 from its rest position (FIG. 28) to its releasing position (FIG. 32).

As the first operating member 54 rotates in the second rotational direction R2 during a cable releasing operation of the shift operating unit 38, the release pawl 86 engages the operating tooth 84a of the release member 84 to move the release member 84 in response to the movement of the first operating member 54. This movement of the release member 84 causes the first pawl operating projection 84b to pivot the stopping pawl 82 towards the positioning ratchet 78 and the third pawl operating projection 84b pivots pulling pawl 76 out of engagement with the positioning ratchet 78. Further movement of the release member 84 also causes the second pawl operating projection 84b to pivot the positioning pawl 80 away from the positioning ratchet 78 and out of engagement with one of the positioning teeth 78a of the positioning ratchet 78. As a result, the take-up member 58, the pulling ratchet 74 and the positioning ratchet 78 rotate in the first rotational direction R1 under the force of the biasing element 62. However, the stopping pawl 82 engages one of the positioning teeth 78a of the positioning ratchet 78 to stop the rotation of the take-up member 58, the pulling ratchet 74 and the positioning ratchet 78 such that the take-up member 58 is held in an intermediate shift position. Then upon releasing the first operating member 54, the release member 84 releases the positioning pawl 80 so that the positioning pawl 80 moves back into the path of the positioning teeth 78a. Then the stopping pawl 82 subsequently moves out of the path of the positioning teeth 78a. Thus, the stopping pawl 82 releases the positioning ratchet 78 after the positioning pawl 80 has moved back into the path of the positioning teeth 78a. In this way, the stopping pawl 82 releases the positioning ratchet 78 so that the positioning pawl 80 engages one of the positioning teeth 78a to stop rotation of the positioning ratchet 78 in the first rotational direction R1. Now, another cable releasing operation of the shift operating unit 38 can be performed by the rider pivotally moving the shift lever 36 about the shift pivot axis P3 in the lateral inward direction towards the bicycle longitudinal center plane.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below", "inner", "outer" and "transverse" as well as any other similar directional terms refer to those directions of a bicycle equipped with the bicycle shift operating device on a flat horizontal surface. Accordingly, these terms, as utilized to describe the bicycle shift operating device should be interpreted relative to a bicycle equipped with the bicycle shift operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A shift positioning mechanism comprising:
   a fixed member;
   a take-up member movably arranged with respect to the fixed member in a first direction and a second direction that is different from the first direction;
   a positioning ratchet fixedly coupled to the take-up member to move with the take-up member;
   a stopping pawl having a stopping tooth and rotatably mounted on a first rotational axis such that the stopping tooth moves between a non-stop position and a stop position to prevent movement of the take-up member in the first direction; and
   a positioning pawl having a positioning tooth and rotatably mounted on the first rotational axis such that the positioning tooth moves between a non-holding position and a holding position to hold the take-up member in the first direction; and
   a releasing member movably arranged between a non-releasing position and a releasing position such that the releasing member rotates the stopping pawl and the positioning pawl,
   the releasing member rotating the stopping pawl and the positioning pawl such that the stopping tooth starts to move from the non-stop position to the stop position prior to the positioning tooth starting to move from the holding position to the non-holding position, and
   the releasing member including a first contact portion that contacts the stopping pawl when the releasing member is in the releasing position and a second contact portion that contacts the positioning pawl when the releasing member is in the releasing position, the first contact portion being located farther from the positioning ratchet than the second contact portion.

2. The shift positioning mechanism according to claim 1, wherein
   the positioning ratchet includes a plurality of positioning teeth, the stopping tooth and the positioning tooth are disposed at opposite sides of the first rotational axis with respect to a movement path of the positioning teeth.

3. The shift positioning mechanism according to claim 1, wherein
   the stopping tooth and the positioning tooth are disposed with respect to the first rotational axis such that a distance between a positioning ratchet contact surface of the stopping tooth and a positioning ratchet contact surface of the positioning tooth is larger than a distance from the first rotational axis to the positioning ratchet contact surface of the stopping tooth and a distance from the first rotational axis to the positioning ratchet contact surface of the positioning tooth.

4. The shift positioning mechanism according to claim 1, wherein
   the positioning pawl is biased towards engagement with the positioning ratchet such that the positioning tooth contacts with the positioning ratchet while the releasing member is in the non-releasing position.

5. The shift positioning mechanism according to claim 1, wherein
   the stopping pawl is biased out of engagement with the positioning ratchet such that the stopping tooth separates from the positioning ratchet while the releasing member is in the non-releasing position.

6. The shift positioning mechanism according to claim 5, wherein
   the positioning pawl is biased towards engagement with the positioning ratchet such that the positioning tooth contacts with the positioning ratchet while the releasing member is in the non-releasing position.

7. The shift positioning mechanism according to claim 1, wherein
   the take-up member, the positioning ratchet and the releasing member are rotatably mounted on a second rotational axis that is offset from the first rotational axis.

8. The shift positioning mechanism according to claim 7, wherein
   the stopping tooth moves closer to the second rotational axis as the stopping pawl rotates from the non-stop position to the stop position.

9. The shift positioning mechanism according to claim 7, wherein
   the positioning tooth moves farther from the second rotational axis as the positioning pawl rotates from the holding position to the non-holding position.

10. The shift positioning mechanism according to claim 9, wherein
    the stopping tooth moves closer to the second rotational axis as the stopping pawl rotates from the non-stop position to the stop position.

* * * * *